United States Patent
Mogi

(10) Patent No.: US 8,631,061 B2
(45) Date of Patent: Jan. 14, 2014

(54) APPARATUS, METHOD, AND PROGRAM FOR ARITHMETIC PROCESSING

(75) Inventor: Yukihiko Mogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1168 days.

(21) Appl. No.: 12/510,674

(22) Filed: Jul. 28, 2009

(65) Prior Publication Data

US 2010/0030833 A1 Feb. 4, 2010

(30) Foreign Application Priority Data

Jul. 29, 2008 (JP) .................................. 2008-194690

(51) Int. Cl.
*G06F 7/38* (2006.01)
*G06F 7/00* (2006.01)

(52) U.S. Cl.
USPC ........... 708/512; 708/201; 708/203; 708/490; 708/200

(58) Field of Classification Search
None
See application file for complete search history.

(56) References Cited

U.S. PATENT DOCUMENTS

2007/0038693 A1* 2/2007 Jacobi et al. .................. 708/446
2009/0256938 A1* 10/2009 Bechtel et al. ................ 348/302

FOREIGN PATENT DOCUMENTS

JP 2001-005643 A 1/2001

* cited by examiner

*Primary Examiner* — Scott Sun
(74) *Attorney, Agent, or Firm* — Wolf, Greenfield & Sacks, P.C.

(57) ABSTRACT

A mantissa/exponent splitter splits an input value $X=(1+X_1/2^{23}) \times (2^{X_2})$ into a mantissa $X_1$ and an exponent $X_2$. An interpolation processor references the mantissa/exponent splitter using the mantissa $X_1$ and determines a power value $(\log_2(1+X_1/2^{23}))$ through an interpolation process. A logarithmic calculator determines a logarithmic value $Z=\log_2 X^Y=Y(X_2+\log_2(1+X_1/2^{23}))$ from the exponent $X_2$ and the power value from the interpolation processor. The integer/fraction splitter splits the logarithmic value Z into an integer $Z_{int}$ and a fraction $Z_{amari}$. The interpolation processor references a power of fraction table storage unit in response to the fraction $Z_{amari}$ and determines a power value $(2^{Z_{amari}})$ through the interpolation process. The power calculator determines $X^Y=2^Z=(2^{Z_{amari}}) \times (2^{Z_{int}})$, thereby resulting in the input value X to the power of Y.

6 Claims, 23 Drawing Sheets

FIG. 10

| | LOGARITHM (NO INTERPOLATION) | LOGARITHM (LINEAR INTERPOLATION) | LOGARITHM (QUADRATIC INTERPOLATION) |
|---|---|---|---|
| POWER (NO INTERPOLATION) | 5.44 × 10⁻³ | 1.35 × 10⁻³ | 1.35 × 10⁻³ |
| POWER (LINEAR INTERPOLATION) | 4.10 × 10⁻³ | 1.71 × 10⁻⁶ | 6.23 × 10⁻⁷ |
| POWER (QUADRATIC INTERPOLATION) | 4.10 × 10⁻³ | 2.18 × 10⁻⁶ | 1.99 × 10⁻⁷ |

FIG. 11

| TABLE SIZE | NO INTERPOLATION | LINEAR INTERPOLATION | QUADRATIC INTERPOLATION |
|---|---|---|---|
| 256 | 5.44 × 10⁻³ | 1.71 × 10⁻⁶ | 1.99 × 10⁻⁷ |
| 128 | 1.12 × 10⁻² | 6.82 × 10⁻⁶ | 2.08 × 10⁻⁷ |
| 64 | 2.23 × 10⁻² | 2.73 × 10⁻⁵ | 5.21 × 10⁻⁷ |
| 32 | 4.44 × 10⁻² | 1.09 × 10⁻⁴ | 3.86 × 10⁻⁶ |
| 16 | 8.82 × 10⁻² | 4.37 × 10⁻⁴ | 3.03 × 10⁻⁵ |
| 8 | 1.70 × 10⁻¹ | 1.74 × 10⁻³ | 2.31 × 10⁻⁴ |
| 4 | 3.00 × 10⁻¹ | 6.91 × 10⁻³ | 1.70 × 10⁻³ |
| 2 | 4.73 × 10⁻¹ | 2.56 × 10⁻² | 1.15 × 10⁻² |

APPARATUS, METHOD, AND PROGRAM FOR ARITHMETIC PROCESSING

BACKGROUND OF THE INVENTION

1. Field of the Invention

The present invention relates to an apparatus, a method and a computer program for arithmetic processing and, in particular, to an apparatus, a method and a computer program for performing accurately a power calculation.

2. Description of the Related Art

Moving picture expert group (MPEG) audio standard is known as a standard defining a method of encoding an audio signal. A plurality of encoding methods are defined by the MPEG standard. MPEG-2 Audio Standard Advanced Audio Coding (AAC) is standardized as the International Organization for Standardization/International Electrotechnical Commission (ISO/IEC) 13818-7.

MPEG-4 Audio Standard AAC encoding method is standardized as extended ISO/IEC 14496-3. In the discussion that follows, the MPEG-2 Audio Standard AAC and the MPEG-4 Audio Standard AAC are collectively referred to as the AAC Standards.

FIG. 1 illustrates an encoder in the related art complying with the AAC Standards.

The encoder includes speech reception and hearing model storage 11, gain controller 12, spectrum processor 13, quantizer/encoding unit 14, and multiplexer 15.

An audio signal input to the encoder is supplied to both the speech reception and hearing model storage 11 and the gain controller 12. The speech reception and hearing model storage 11 organizes the input signal into blocks along the time axis, analyzes the blocked audio signal on a per split band in accordance with human hearing characteristics, and then calculates a permissible error intensity of each split band.

The gain controller 12, used for a scalable sampling rate (SSR) profile only, splits the supplied audio signal into four equally spaced frequency bands, and adjusts gain of the bands other than the lowest frequency band.

The spectrum processor 13 converts the audio signal gain-adjusted by the gain controller 12 into spectral data. The spectrum processor 13 also controls each element thereof in response to the permissible error intensity supplied from the speech reception and hearing model storage 11, thereby performing a predetermined process on the spectral data.

The spectrum processor 13 includes modified discrete cosine transform (MDCT) unit 21, temporal noise shaping (TNS) processing unit 22, intensity coupler 23, predictor 24, and middle/side (M/S) stereo unit 25.

The MDCT unit 21 converts the audio signal in the time domain supplied from the gain controller 12 into spectral data in the frequency domain. The TNS processing unit 22 processes the spectral data, into which the MDCT unit 21 has converted the audio signal. The TNS processing unit 22 thus adjusts the temporal shape of quantization noise. The intensity coupler 23 performs a joint stereo encoding process on the audio signal processed by the TNS processing unit 22.

The predictor 24 performs a prediction encoding process on the audio signal joint stereo encoded by the intensity coupler 23 and the audio signal supplied by a quantizer 27. The predictor 24 then supplies the resulting audio signal to the M/S stereo unit 25. The M/S stereo unit 25 joint-stereo-encodes the audio signal from the predictor 24 and supplies the resulting audio signal to the quantizer/encoding unit 14.

The quantizer/encoding unit 14 converts the audio signal from the M/S stereo unit 25 into a code sequence, and then supplies the code sequence to the multiplexer 15. The quantizer/encoding unit 14 includes normalized coefficient unit 26, quantizer 27, and Huffman coder 28.

The normalized coefficient unit 26 then supplies the audio signal from the M/S stereo unit 25 to the quantizer 27. The normalized coefficient unit 26 also calculates a normalized coefficient for use in the quantization of the audio signal in response to the audio signal from the M/S stereo unit 25, and then supplies the normalized coefficient to each of the quantizer 27 and the Huffman coder 28. For example, the normalized coefficient unit 26 calculates a quantization step parameter as the normalized coefficient for each split band using the permissible error intensity from the speech reception and hearing model storage 11.

The quantizer 27 non-linear quantizes the audio signal from the normalized coefficient unit 26 using the normalized coefficient from the normalized coefficient unit 26. The quantizer 27 supplies the resulting audio signal (a quantized value) to each of the Huffman coder 28 and the predictor 24. In accordance with a predetermined Huffman code table, the Huffman coder 28 imparts a Huffman code to each of the normalized coefficient from the normalized coefficient unit 26 and the quantized value from the quantizer 27, thereby Huffman encoding the normalized coefficient and the quantized value. The Huffman encoded normalized coefficient and quantized value are thus supplied to the multiplexer 15.

The multiplexer 15 multiplexes the Huffman code supplied from the Huffman coder 28 and a variety of information generated in the course of encoding of the audio signal, supplied by the gain controller 12, and the MDCT unit 21 through the normalized coefficient unit 26. The multiplexer 15 thus generates and outputs a bit stream of the encoded audio signal.

The quantizer 27 performs the non-linear quantization process on the audio signal by calculating the following equation (1) in response to an input value AX as the value of the audio signal from the normalized coefficient unit 26 and a quantization step parameter q as the normalized coefficient from the normalized coefficient unit 26. More specifically, a quantized value RZ is determined from the input value AX of the audio signal in accordance with equation (1):

$$RZ = (\text{int})\left(\left(\frac{AX}{2^{q/4}}\right)^{3/4} - 0.0946 + 0.5\right) \quad (1)$$

where (int)(A) represents an operation that results in an integer part of a floating-point number A by rounding down a fraction portion. The same is true in the discussion that follows.

In the encoding of the AAC Standards, the quantized value RZ is defined as 14 bits. A reverse operation shows that a value $AY = AX/2^{q/4}$ prior to the quantization has a range of $0 \leq AY < 8191.5943^{(4/3)}$. The quantized value RZ is an integer falling within the range of $0 \leq RZ \leq 8191$. The quantization step parameter q is determined so that the quantized value RZ falls within this range.

During the quantization of the audio signal, the quantizer 27 dequantizes the quantized values RZ of all the input values AX, and determines whether each quantization error falls within a predetermined range. For example, the dequantization is performed in accordance with the following equation (2), and a dequantized value W is thus obtained:

$$W = (RZ)^{4/3} \quad (2)$$

The quantization error is determined by determining a difference between the dequantized value W and the input value AX. It is thus determined whether the difference falls within the predetermined range.

A method of efficiently obtaining results of a power operation to the power of 3/4 in equation (1) or a power operation to the power of 4/3 in equation (2) is disclosed (Japanese Unexamined Patent Application Publication No. 2001-5643). In accordance with the disclosure, an input value X as a floating-point number is split into an exponent and a mantissa, and a logarithmic value Z with respect to a base 2 of an arithmetic value P that is obtained by raising the input value X to the power of Y is determined. The logarithmic value Z is then expressed back to the sought arithmetic value P using the power of 2. The power operation result of the input value X is thus obtained.

In accordance with the disclosure, the power operation is performed as described below. A particular process is performed if the base is Napier's constant or a multiple of 2. A general process other than the particular process for such bases is described below.

Let P represent an arithmetic value P as the result of the power operation of raising the input value X to the power of Y, the following equation (3) holds:

$$P = X^Y \quad (3)$$

The input value X is split into a mantissa $X_1$ as a mantissa part of the floating-point number and an exponent $X_2$ as an exponent part of the floating-point number, and the power operation of the input value X to the power Y is then considered.

The floating-point number is described first. Data of floating-point type indicating a single precision floating-point type number based on the Institute for Electrical and Electronics Engineering (IEEE) 754 Standard is constructed of a 32-bit bit sequence as illustrated in FIG. 2.

A 23-bit portion from zero-th bit as the least significant bit of the data of the floating-point number to 22nd bit is a mantissa $X_1$ as a mantissa part of the floating-point number. An 8-bit portion from 23rd bit to 30th bit is an exponent $X_2$ of an exponent part of the floating-point number. The most significant bit as the 31st bit is a sign bit S.

The sign bit S is "0" if the mantissa part is positive, and is "1" if the mantissa part is negative. The bit structure of the exponent part is "an exponent+bias." The exponent $X_2$ as the exponent part is the sum of an actual exponent value and a bias. In accordance with the IEEE754 Standard, 127 is used as a single precision bias. If the exponent value is "0," the exponent $X_2$ is "127" (=0+127). The exponent part has a bit structure of 127, namely, 0x7f. Here 0x means that "7f" is a hexadecimal number.

The exponent part of 0 or 255 has a particular meaning, but the discussion thereof is omitted here.

If the input value X of floating-point type data is represented in a numerical form, the input value X is represented as in the following equation (4):

$$(-1)^S \times 2^{(X_2-B)} \times (1+.X_1) = (-1)^S \times 2^{(X_2-B)} \times (1+X_1/2^{23}) \quad (4)$$

where ".$X_1$" represents a mantissa part with a decimal point on the premise that the decimal point is placed prior to an upper bit of the mantissa $X_1$. Also in equation (4), "B" represents a bias component and "S" represents a sign bit.

In accordance with Japanese Unexamined Patent Application Publication No. 2001-5643, the input value X as the floating-point number is split into the mantissa $X_1$ and the exponent $X_2$ before the power operation.

Let $X_1$ represent a mantissa of the mantissa part of the input value X and $X_2$ represent an exponent of the exponent part of the input value X, and the input value X is represented by equation (5):

$$X = (1+X_1/2^{23}) \times 2^{X_2} \quad (5)$$

If the logarithm of base 2 is calculated to both sides of equation (3), equation (6) holds:

$$Z = \log_2 P = Y\{X_2 + \log_2(1+X_1/2^{23})\} \quad (6)$$

Let $Z_{int}$ represent an integer part of the logarithmic value Z and $Z_{amari}$ represent a fraction part of the logarithmic value Z, and the arithmetic value P is represented by the following equation (7):

$$\begin{aligned} P &= 2^{\log_2 P} \\ &= 2^Z \\ &= 2^{Z_{amari}} \times 2^{Z_{int}} \end{aligned} \quad (7)$$

The integer $Z_{int}$ and the fraction $Z_{amari}$ in equation (7) are determined from equation (6). From equations (6) and (7), the arithmetic value P resulting from raising the input value X to the power of Y is thus determined.

A quantizing apparatus 51 that quantizes the audio signal by performing the power operation in this way is illustrated in FIG. 3.

The quantizing apparatus 51 corresponds to the quantizer 27 illustrated in FIG. 1. The quantizing apparatus 51 receives a value AY prior to quantization as the input value X and a power exponent Y=¾ in equation (1).

A mantissa-exponent splitter 61 splits the supplied input value X into the mantissa $X_1$ and the exponent $X_2$, and then supplies the mantissa $X_1$ and the exponent $X_2$ to the logarithmic calculator 62. A logarithmic calculator 62 receives a power exponent Y. The logarithmic calculator 62 then calculates equation (6) in response to the mantissa $X_1$ and the exponent $X_2$, supplied from the mantissa/exponent splitter 61, and the supplied power exponent Y, thereby determining a logarithmic value Z. In this operation, the logarithmic calculator 62 acquires a logarithmic value "$\log_2(1+X_1/2^{23})$" as a mantissa part of the input value X from a logarithmic mantissa table storage unit 63 using an index index1 determined from the mantissa $X_1$ and substitutes the logarithmic value $\log_2(1+X_1/2^{23})$ in equation (6). The index index1 is used to identify a logarithmic value as a mantissa part of the input value X for the mantissa $X_1$.

The logarithmic mantissa table storage unit 63 stores a logarithmic mantissa table listing logarithmic values of the mantissa part of the input value X with respect to the mantissa $X_1$. An integer/fraction splitter 64 splits the logarithmic value Z from the logarithmic calculator 62 into an integer $Z_{int}$ and a fraction $Z_{amari}$.

A power calculator 65 calculates the above-described equation (7) using the integer $Z_{int}$ and the fraction $Z_{amari}$, from the integer/fraction splitter 64, thereby acquiring an arithmetic value P as floating-point type data. In this operation, the power calculator 65 acquires a power value $2^{\wedge}Z_{amari}$ having base 2 with a power exponent of the fraction $Z_{amari}$ using index index2 determined from the fraction $Z_{amari}$, and substitutes the power value $2^{\wedge}Z_{amari}$ in equation (7). The index index2 is used to identify a power value as a power of 2 with respect to the fraction $Z_{amari}$.

The symbol "^" denotes a power operation in the power value $2^{\wedge}Z_{amari}$, and the same is true in the discussion that follows. In other words, $2^{\wedge}Z_{amari}$ means 2 to the power of $Z_{amari}$.

A power of fraction table storage unit 66 stores a power of fraction table listing power values having base 2 with respect to the value the fraction $Z_{amari}$. An integer converter 67 extracts an integer part of a number that results from adding a predetermined constant value α to the arithmetic value P determined by the power calculator 65. The integer converter 67 outputs the extracted integer part as a quantized value RZ of the input value X. In this case, the constant α is "−0.0946+0.5" in equation (1).

A quantization process of the quantizing apparatus 51 is discussed with reference to a flowchart illustrated in FIG. 4.

In step S11, the logarithmic mantissa table storage unit 63 and the power of fraction table storage unit 66 respectively generate a logarithmic mantissa table and a power of fraction table.

The logarithmic mantissa table storage unit 63 generates the logarithmic mantissa table composed of logarithmic values logtable[i] of the mantissa part of the input value X represented by equation (8) with a table size of the logarithmic mantissa table being $2^N$=SIZE:

$$\text{logtable}[i]=\log_2(1+i/\text{SIZE}), i=0,\ldots,\text{SIZE}-1 \qquad (8)$$

where the table size SIZE is a count of numbers represented by data of N bits. The logarithmic values logtable[i] are prepared for the count of the table size SIZE. A variable "i" of the logarithmic values logtable[i] indicates the value of the index index1 determined from the mantissa $X_1$, and is i=0, ..., (SIZE−1).

With $2^N$=SIZE representing the table size of the power of fraction table, the power of fraction table storage unit 66 generates the power of fraction table composed of a power value twotable[i] having base 2 with the fraction $Z_{amari}$ as a power exponent as represented by equation (9)

$$\text{twotable}[i]=2^{(i/\text{SIZE})}, i=0,\ldots,\text{SIZE}-1 \qquad (9)$$

where the variable "i" of the power value twotable[i] indicates the value of index index2 determined from the fraction $Z_{amari}$ and is i=0, ..., (SIZE−1).

In step S12, the mantissa/exponent splitter 61 determines the mantissa $X_1$ and the exponent $X_2$ of the supplied input value X.

In step S13, the logarithmic calculator 62 calculates equation (6) using the mantissa $X_1$ and the exponent $X_2$ from the mantissa/exponent splitter 61, thereby determining the logarithmic value Z.

More specifically, the logarithmic calculator 62 calculates equation (10) using the mantissa $X_1$, thereby determining as the index index1 as the value of upper N bits from the 22nd bit of the mantissa $X_1$. Using the index index1, the logarithmic calculator 62 further determines the logarithmic value logtable[index1] as the mantissa part of the input value X in accordance with the following equation (11):

$$\text{index1}=X_1\text{>>}(23-N) \qquad (10)$$

$$\log_2(1+X_1/2^{23})=\text{logtable}[\text{index1}] \qquad (11)$$

In equation (10), ">>" denotes a right-shift operation. Since the mantissa $X_1$ is 32 bits, the value of the upper N bits of the mantissa $X_1$ can be extracted if the mantissa $X_1$ is right-shifted by (23−N) bits.

The logarithmic calculator 62 acquires the logarithmic value logtable[index1] from the logarithmic mantissa table storage unit 63. The logarithmic value logtable[index1] has as a variable i the index index1 with the value of the upper N bits extracted from the mantissa $X_1$ being the index index1. The acquired logarithmic value logtable[index1] is the logarithmic value ($\log_2(1+X_1/2^{23})$) of the mantissa part of the input value X.

The logarithmic calculator 62 substitutes the exponent $X_2$ from the mantissa/exponent splitter 61, the supplied power exponent Y, and the determined arithmetic value into equation (6), thereby determining the logarithmic value Z.

In step S14, the integer/fraction splitter 64 splits the logarithmic value Z from the logarithmic calculator 62 into the integer $Z_{int}$ and the fraction $Z_{amari}$. More specifically, the integer/fraction splitter 64 calculates the following equations (12) and (13), thereby determining the integer $Z_{int}$ and the fraction $Z_{amari}$:

$$Z_{int} = \begin{cases} (\text{int})Z & Z \geq 0 \\ (\text{int})Z - 1 & Z < 0 \end{cases} \qquad (12)$$

$$Z_{amari} = (\text{int})((Z - (\text{int})Z) \times 2^{23}) \qquad (13)$$

If the logarithmic value Z is equal to or greater than zero in equation (12), the integer part of the logarithmic value Z is extracted and treated as the integer $Z_{int}$. If the logarithmic value Z is smaller than zero, the integer part of the logarithmic value Z is extracted and 1 is subtracted from the extracted integer part. The resulting value is treated as the integer $Z_{int}$.

In equation (13), a value (difference) resulting from subtracting the integer part of the logarithmic value Z from the logarithmic value Z is multiplied by $2^{23}$. The integer part of the resulting product is the fraction $Z_{amari}$. In other words, the fraction part of the logarithmic value Z is calculated by determining a difference between the logarithmic value Z and the integer part of the logarithmic value Z. The fraction part is multiplied by $2^{23}$, and the integer part of the resulting product is thus extracted. The fraction part of the logarithmic value Z is thus converted into a fixed-point number with the decimal point placed at the 23rd bit.

In step S15, the power calculator 65 determines the arithmetic value P based on the integer $Z_{int}$ and the fraction $Z_{amari}$ from the integer/fraction splitter 64.

More specifically, by calculating equations (14) and (15), the power calculator 65 determines the index index2, and then determines the power value having base 2 ($2^{\wedge}Z_{amari}$) using the index index2 in accordance with equation (16):

$$\text{index2}'=Z_{amari}\text{>>}(23-N) \qquad (14)$$

$$\text{index2}=\text{index2}'\&(\text{SIZE}-1) \qquad (15)$$

$$2^{Z_{amari}}=\text{twotable}[\text{index2}] \qquad (16)$$

Symbol ">>" in equation (14) denotes a right-shift operation, and symbol "&" in equation (15) denotes an AND gate operation.

The power calculator 65 extracts as an index index2' the value of the upper bits of the fraction $Z_{amari}$ from a (23−N)-th bit of the fraction $Z_{amari}$ by right-shifting the fraction $Z_{amari}$ by (23−N) bits. The fraction $Z_{amari}$ is a fixed-point number with the decimal point at the 23rd bit in accordance with equation (13). If the fraction $Z_{amari}$ is right-shifted by (23−N) bits, the value of the upper bits from the (23−N)-th bit of the fraction part of the fraction $Z_{amari}$ is extracted.

The power calculator 65 determines the index index2 of N bits by AND gating the index index2' thus calculated and (SIZE−1), and retrieves from of the power of fraction table of the power of fraction table storage unit 66 the power value twotable[index2] with the index index2 as a variable i thereof. The power value twotable [index2] thus retrieved is the power value $2\hat{}Z_{amari}$ having base 2.

The power calculator 65 calculates equation (17) using the integer $Z_{int}$ from the integer/fraction splitter 64, thereby determining the power value $2\hat{}Z_{int}$ having base 2 with the integer $Z_{int}$ being a power exponent:

$$2^{Z_{int}} = (Z_{int} + 127) << 23 \quad (17)$$

where symbol "<<" denotes a left-shift operation. More specifically, the power calculator 65 adds the bias component "127" to the integer $Z_{int}$ in order to convert the power value ($2\hat{}Z_{int}$) to data in the floating-point format defined in the IEEE754 Standard, and then left-shifts the sum by 23 bits. The left-shift operation is performed by 23 bits since the exponent part of the floating-point number is a portion of 30th bit to 23rd bit of the floating-point data.

The power value ($2\hat{}Z_{amari}$) and the power value ($2\hat{}Z_{int}$) are thus obtained. The power calculator 65 calculates equation (18) to determine the arithmetic value P.

$$P = 2^{Z_{amari}} \times 2^{Z_{int}} \quad (18)$$

In step S16, the integer converter 67 determines and outputs the quantized value RZ of the input value X using the arithmetic value P determined by the power calculator 65. The quantization process thus ends.

More specifically, the integer converter 67 calculates equation (19) based on the arithmetic value P and the predetermined constant α, thereby determining the quantized value RZ.

$$RZ = (\text{int})(P + \alpha) \quad (19)$$

The quantizing apparatus 51 calculates the power value of the input value X and the quantized value RZ in this way.

SUMMARY OF THE INVENTION

The above-described technique is associated with difficulty performing a power calculation in a simple and accurate manner with a small amount of memory.

For example, the following equation (20) may be calculated using a set of L units of data, each set including an arithmetic value P of a power value calculated by the quantizing apparatus 51 and a power value Q calculated using a mathematical library in order to calculate a relative error mean value T in the evaluation of power calculation accuracy:

$$T = \frac{1}{L} \sum_{i=1}^{L} \frac{|P_i - Q_i|}{Q_i} \quad (20)$$

where $P_i$ represents an i-th sample of the arithmetic value P calculated by the quantizing apparatus 51, and $Q_i$ represents the number corresponding to $P_i$ determined through the mathematical library.

The inventors of this invention calculated equation (20) with L=8192 to evaluate the calculation accuracy of the arithmetic value P by the quantizing apparatus 51. With N of the table size $2^N$ being 8, i.e., SIZE=256, the relative error mean value was $T=5.45 \times 10^3$, which means that the resulting accuracy level is not so high. With N of the table size $2^N$ being 16, i.e., SIZE=65536, the relative error mean value was $T=5.10 \times 10^{-6}$, which means that the resulting accuracy level is higher than that of N=8.

In order to increase the accuracy of the power calculation, the table size of each of the logarithmic mantissa table and the power of fraction table have to be increased. The memory capacity storing these tables becomes insufficient. If the size of each table is reduced, the accuracy level of the power calculation is lowered.

When the audio signal is quantized in accordance with equation (1), the arithmetic value P is determined through the power calculation. The constant α is added to the arithmetic value P, followed by an integerization operation. The determination of the integer of the power value has not been an easy operation.

It is thus desirable to perform a power calculation in a simple and accurate manner with a small amount of memory. It is also desirable to determine easily an integer of a power value.

According to one embodiment of the present invention, an arithmetic processing apparatus for determining an arithmetic value P, the arithmetic value P being an input value X raised to the power of a variable Y as an exponent, and the input value X represented by a base-M system with M being a predetermined constant number, includes mantissa/exponent splitting means for splitting the input X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number, first recording means for recording a logarithmic value of the mantissa of the input value X having the constant number M as a base thereof, determined with respect to the mantissa $X_1$, interpolating means for performing an interpolation process on a plurality of logarithmic values retrieved from the first recording means in response to the mantissa $X_1$ in order to determine the final logarithmic value of the mantissa, logarithmic calculation means for calculating a logarithmic value Z of the arithmetic value P having the constant number M as a base thereof, based on the variable Y, the exponent $X_2$, and the logarithmic value of the mantissa determined by the interpolating means, and power calculation means for calculating the arithmetic value P by raising the constant value M to the power of the logarithmic value Z of the arithmetic value P as an exponent.

The arithmetic processing apparatus may further include integer/fraction splitting means for splitting the logarithmic value Z of the arithmetic value P into an integer $Z_{int}$ as an integer part of the logarithmic value Z and a fraction $Z_{amari}$ as a fraction part of the logarithmic value Z, and second recording means for recording the power value of the constant number M determined by raising the constant value M to the power of the fraction part $Z_{amari}$ as an exponent. The power calculation means calculates the arithmetic value P based on the power value of the constant number M retrieved from the second recording means in response to the fraction $Z_{amari}$, and the integer $Z_{int}$.

The interpolating means may determine the final power value of the constant number M by performing the interpolation process on a plurality of power values retrieved from the second recording means in response to the fraction $Z_{amari}$, and the power calculation means may calculate the arithmetic value P based on the power value of the constant number M determined by the interpolating means, and the integer $Z_{int}$.

According to one embodiment of the present invention, one of a program and a method for causing an arithmetic processing apparatus to determine an arithmetic value P, the arithmetic value P being an input value X raised to the power of a variable Y as an exponent, and the input value X represented by a base-M system with M being a predetermined constant number, includes the steps of splitting the input X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number, performing an interpolation process on a plurality of logarithmic values of the mantissa of the input value X having the constant number M as a base determined with respect to the mantissa $X_1$ in order to determine the final logarithmic value of the mantissa, calculating a logarithmic value Z of the arithmetic value P having the constant number M as a base thereof, based on the variable Y, the exponent $X_2$, and the logarithmic value of the mantissa determined in the interpolation process, and calculating the arithmetic value P by raising the constant value M to the power of the logarithmic value Z of the arithmetic value P as an exponent.

The arithmetic processing apparatus determines the arithmetic value P, the arithmetic value P being the input value X raised to the power of the variable Y as an exponent, and the input value X represented by a base-M system with M being a predetermined constant number. The input X in floating-point type data is split into the mantissa $X_1$ and the exponent $X_2$, the mantissa $X_1$ being the mantissa part representing the mantissa of the input value X of a floating-point number, and the exponent $X_2$ being the exponent part representing the exponent of the input value X of the floating-point number. The interpolation process is performed on the plurality of logarithmic values of the mantissa part of the input value X having the constant number M as the base determined with respect to the mantissa $X_1$ in order to determine the final logarithmic value of the mantissa. The logarithmic value Z of the arithmetic value P having the constant number M as a base thereof is calculated based on the variable Y, the exponent $X_2$, and the logarithmic value of the mantissa determined in the interpolation process. The arithmetic value P is determined by raising the constant value M to the power of the logarithmic value Z of the arithmetic value P as an exponent.

According to one embodiment of the present invention, an arithmetic processing apparatus for determining an arithmetic value P, the arithmetic value P being an input value X raised to the power of a variable Y as an exponent, and the input value X represented by a base-M system with M being a predetermined constant number, includes logarithmic calculation means for calculating a logarithmic value Z of the arithmetic value P having the constant number M as a base thereof, based on the input value X and the variable Y, integer/fraction splitting means for splitting the logarithmic value Z of the arithmetic value P into an integer $Z_{int}$ as an integer part of the logarithmic value Z and a fraction $Z_{amari}$ as a fraction part of the logarithmic value Z, first recording means for recording a power value of the constant number M raised to the power of the fraction $Z_{amari}$ as an exponent, interpolating means for performing an interpolation process on a plurality of logarithmic values retrieved from the first recording means in response to the fraction $Z_{amari}$ in order to determine the final power value of the constant number M, and power calculation means for calculating the arithmetic value P by raising the constant value M to the power of the logarithmic value Z of the arithmetic value P as an exponent, based on the power value of the constant number M determined by the interpolating means and the integer $Z_{int}$.

The arithmetic processing apparatus may further include mantissa/exponent splitting means for splitting the input X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number. The logarithmic calculation means calculates the logarithmic value Z of the arithmetic value P based on the mantissa $X_1$, the exponent $X_2$, and the variable Y.

The arithmetic processing apparatus may further include second recording means for recording the logarithmic value of the mantissa of the input value X having the constant number M as a base, determined with respect to the mantissa $X_1$. The logarithmic calculation means calculates the logarithmic value Z of the arithmetic value P, based on the logarithmic value of the mantissa retrieved from the second recording means in response to the mantissa $X_1$, the variable Y, and the exponent $X_2$.

According to one embodiment of the present invention, one of a program and a method for causing an arithmetic processing apparatus to determine an arithmetic value P, the arithmetic value P being an input value X raised to the power of a variable Y as an exponent, and the input value X represented by a base-M system with M being a predetermined constant number, includes the steps of calculating a logarithmic value Z of the arithmetic value P having the constant number M as a base thereof, based on the input value X and the variable Y, splitting the logarithmic value Z of the arithmetic value P into an integer $Z_{int}$ as an integer part of the logarithmic value Z and a fraction $Z_{amari}$ as a fraction part of the logarithmic value Z, performing an interpolation process on a plurality of power values of the constant number M calculated by raising the constant number M to the power of the fraction $Z_{amari}$ as an exponent in order to determine the final power value of the constant number M, and calculating the arithmetic value P by raising the constant value M to the power of the logarithmic value Z of the arithmetic value P as an exponent, based on the power value of the constant number M determined in the interpolation process and the integer $Z_{int}$.

The arithmetic processing apparatus determines an arithmetic value P, the arithmetic value P being an input value X raised to the power of a variable Y as an exponent, and the input value X represented by a base-M system with M being a predetermined constant number. The logarithmic value Z of the arithmetic value P having the constant number M as a base thereof is determined based on the input value X and the variable Y. The logarithmic value Z of the arithmetic value P is split into the integer $Z_{int}$ as the integer part of the logarithmic value Z and the fraction $Z_{amari}$ as the fraction part of the logarithmic value Z. The final power value of the constant number M is determined by performing the interpolation process on the plurality of power values of constant number M to the power of the fraction $Z_{amari}$. The arithmetic value P is determined by raising the constant value M to the power of the logarithmic value Z of the arithmetic value P as an exponent, based on the power value of the constant number M determined in the interpolation process, and the integer $Z_{int}$.

According to one embodiment of the present invention, an arithmetic processing apparatus for determining an integer of an arithmetic value P, the arithmetic value P being an input value X raised to the power of a variable Y as an exponent, and the input value X represented by a base-M system with M being a predetermined constant number, includes logarithmic calculation means for calculating a logarithmic value Z of the arithmetic value P having the constant number M as a base thereof, based on the input value X and the variable Y, integer/fraction splitting means for splitting the logarithmic value Z of the arithmetic value P into an integer $Z_{int}$ as an integer part of the logarithmic value Z and a fraction $Z_{amari}$ as a fraction part of the logarithmic value Z, and power integer converting means for determining the integer of the arithmetic value P by performing a right-shift operation on fixed-point data indicating the power value of the constant number M to the power of the fraction $Z_{amari}$ as an exponent, by the number of bits, the number of bits being obtained by subtracting the integer $Z_{int}$ from the number of bits of the fixed-point data from the least significant bit of the fixed-point data to the position of the decimal point of the fixed-point data.

The arithmetic processing apparatus may further include recording means for recording the power value of the constant number M determined by raising the constant number M to the power of the fraction $Z_{amari}$ as an exponent. The power integer converting means determines the integer of the arithmetic value P, based on the power value of the constant number M retrieved from the recording means in response to the fraction $Z_{amari}$, and the integer $Z_{int}$.

The arithmetic processing apparatus may further include interpolating means for performing an interpolation process on a plurality of power values retrieved from the recording means in response to the fraction $Z_{amari}$ in order to determine the final power value of the constant number M. The power integer converting means determines the integer of the arithmetic value P, based on the power value of the constant number M determined in the interpolation process, and the integer $Z_{int}$.

According to one embodiment of the present invention, one of a program and a method for causing an arithmetic processing apparatus to determine an integer of an arithmetic value P, the arithmetic value P being an input value X raised to the power of a variable Y as an exponent, and the input value X represented by a base-M system with M being a predetermined constant number, includes the steps of calculating a logarithmic value Z of the arithmetic value P having the constant number M as a base thereof, based on the input value X and the variable Y, splitting the logarithmic value Z of the arithmetic value P into an integer $Z_{int}$ as an integer part of the logarithmic value Z and a fraction $Z_{amari}$ as a fraction part of the logarithmic value Z, and determining the integer of the arithmetic value P by performing a right-shift operation on fixed-point data indicating the power value of the constant number M to the power of the fraction $Z_{amari}$ as an exponent, by the number of bits, the number of bits being obtained by subtracting the integer $Z_{int}$ from the number of bits of the fixed-point data from the least significant bit of the fixed-point data to the position of the decimal point of the fixed-point data.

The arithmetic processing apparatus determines the integer of the arithmetic value P, the arithmetic value P being the input value X raised to the power of the variable Y as the exponent, and the input value X represented by the base-M system with M being the constant number. The logarithmic value Z of the arithmetic value P having the constant number M as a base thereof is determined based on the input value X and the variable Y. The logarithmic value Z of the arithmetic value P is split into the integer $Z_{int}$ as an integer part of the logarithmic value Z and the fraction $Z_{amari}$ as a fraction part of the logarithmic value Z. The integer of the arithmetic value P is determined by performing the right-shift operation on the fixed-point data indicating the power value of the constant number M to the power of the fraction $Z_{amari}$ as an exponent, by the number of bits, the number of bits being obtained by subtracting the integer $Z_{int}$ from the number of bits of the fixed-point data from the least significant bit of the fixed-point data to the position of the decimal point of the fixed-point data.

According to embodiments of the present invention, a high-accuracy power calculation is easily performed using a small amount memory.

According to embodiments of the present invention, an integer of a power value is easily calculated.

BRIEF DESCRIPTION OF THE DRAWINGS

FIG. 10 illustrates a relative error mean value;

FIG. 11 illustrates the relative error mean value;

DESCRIPTION OF THE PREFERRED EMBODIMENTS

The embodiments of the present invention are described below with reference to the drawings.

First Embodiment

An arithmetic processing method performed by an arithmetic processing apparatus of a first embodiment of the present invention is described below.

The arithmetic processing apparatus of the first embodiment of the present invention splits a supplied input value X into a mantissa $X_1$ and an exponent $X_2$ in accordance with the IEEE754 Standard, and then determines the input value X to the power of Y. More specifically, the arithmetic processing apparatus calculates the above-described equations (6) and (7), and then determines an arithmetic value P being the input value X raised to the power of Y.

The mantissa $X_1$ is a mantissa part representing a mantissa of the input value X, and the exponent $X_2$ is an exponent part representing an exponent of the input value X. Also, the mantissa of the input value X is a mantissa part $(1+X_1/2^{23})$ when the input value X is represented by a floating-point number as represented in equation (5).

When the arithmetic value P is determined, the arithmetic processing apparatus obtains a logarithmic value $(\log_2(1+X_1/2^{23}))$ as the mantissa part of the input value X through an interpolation process using a logarithmic mantissa table. The logarithmic mantissa table contains a table value indicating a logarithmic value of the mantissa part of the input value X with reference to the mantissa $X_1$. The integer $Z_{int}$ and the fraction $Z_{amari}$ now respectively represent the integer part and the fraction part of the logarithmic value Z in equation (6). The arithmetic processing apparatus obtains a power value $2^{Z_{amari}}$ through an interpolation process using a power of fraction table. The power of fraction table lists a table value indicating a power value having 2 as a base with reference to the fraction $Z_{amari}$.

Figure 5:
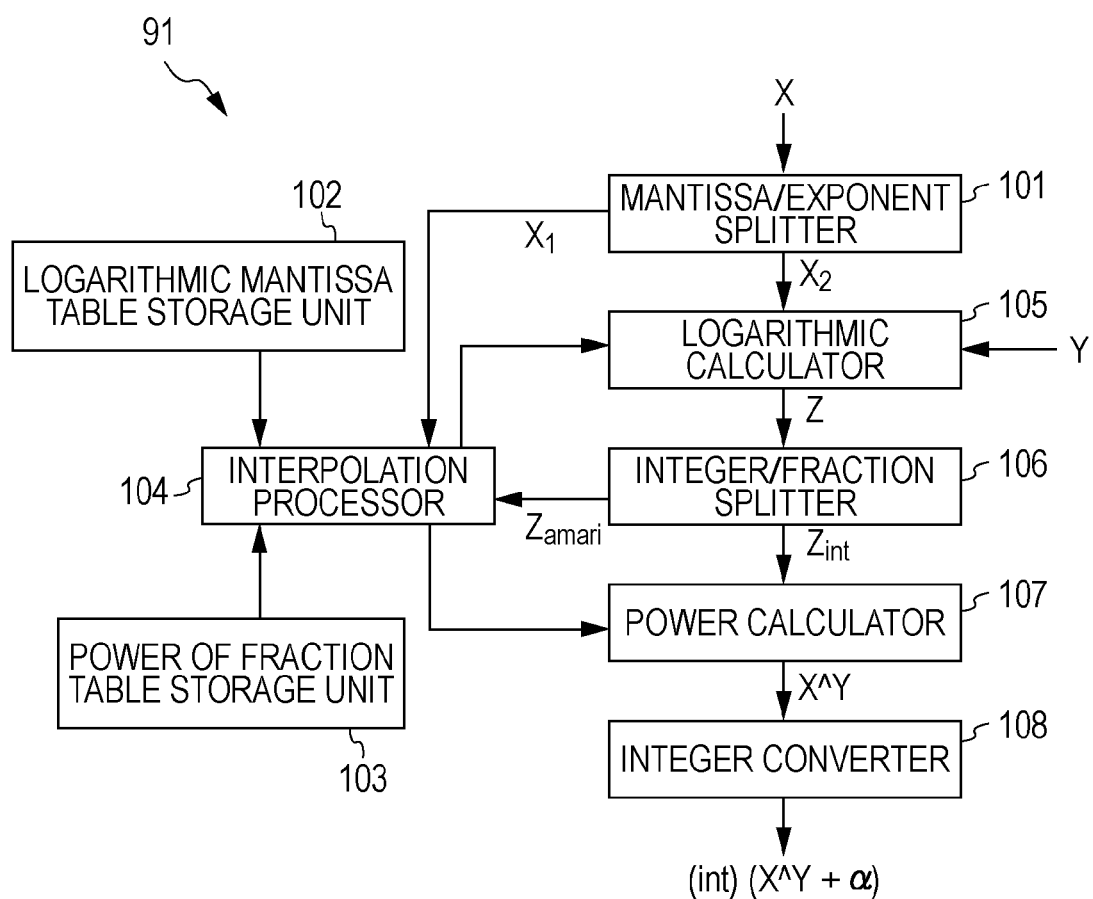
FIG. 5 illustrates an arithmetic processing apparatus in accordance with one embodiment of the present invention.

FIG. 5 illustrates an arithmetic processing apparatus 91 of the first embodiment of the present invention.

The arithmetic processing apparatus 91 includes mantissa/exponent splitter 101, logarithmic mantissa table storage unit 102, power of fraction table storage unit 103, interpolation processor 104, logarithmic calculator 105, integer/fraction splitter 106, power calculator 107, and integer converter 108. In the arithmetic processing apparatus 91, the mantissa/exponent splitter 101 receives the input value X and the logarithmic calculator 105 receives the power exponent Y.

The mantissa/exponent splitter 101 splits the supplied input value X into the mantissa $X_1$ and the exponent $X_2$ in accordance with the IEEE754 Standard, supplies the mantissa $X_1$ to the interpolation processor 104 and supplies the exponent $X_2$ to the logarithmic calculator 105.

The logarithmic mantissa table storage unit 102 stores the logarithmic mantissa table. The power of fraction table storage unit 103 stores the power of fraction table. The interpolation processor 104 retrieves, from the logarithmic mantissa table of the logarithmic mantissa table storage unit 102, a table value identified by the mantissa $X_1$ from the mantissa/exponent splitter 101, and performs the interpolation process on the table value. The interpolation processor 104 then supplies a resulting logarithmic value of the mantissa part of the input value X to the logarithmic calculator 105.

The interpolation processor 104 acquires form the power of fraction table of the power of fraction table storage unit 103 a table value identified by the fraction $Z_{amari}$ from the integer/fraction splitter 106, and performs the interpolation process on the table value and supplies the resulting power value to the power calculator 107.

The logarithmic calculator 105 calculates the logarithmic value Z of the arithmetic value P having 2 as a base based on the exponent $X_2$ from the mantissa/exponent splitter 101, the supplied power exponent Y, and the logarithmic value from the interpolation processor 104. The logarithmic calculator 105 then supplies the logarithmic value Z to the integer/fraction splitter 106. The integer/fraction splitter 106 splits the logarithmic value Z from the logarithmic calculator 105 into the integer $Z_{int}$ and the fraction $Z_{amari}$, supplies the integer $Z_{int}$ to the power calculator 107 and supplies the fraction $Z_{amari}$ to the interpolation processor 104.

The power calculator 107 calculates the arithmetic value P based on the integer $Z_{int}$ from the integer/fraction splitter 106 and the power value from the interpolation processor 104. The power calculator 107 then supplies the arithmetic value P to the integer converter 108. The integer converter 108 extracts the integer part of a value that is obtained by adding a predetermined constant α to the arithmetic value P from the power calculator 107, and outputs the extracted integer part.

Figure 1:
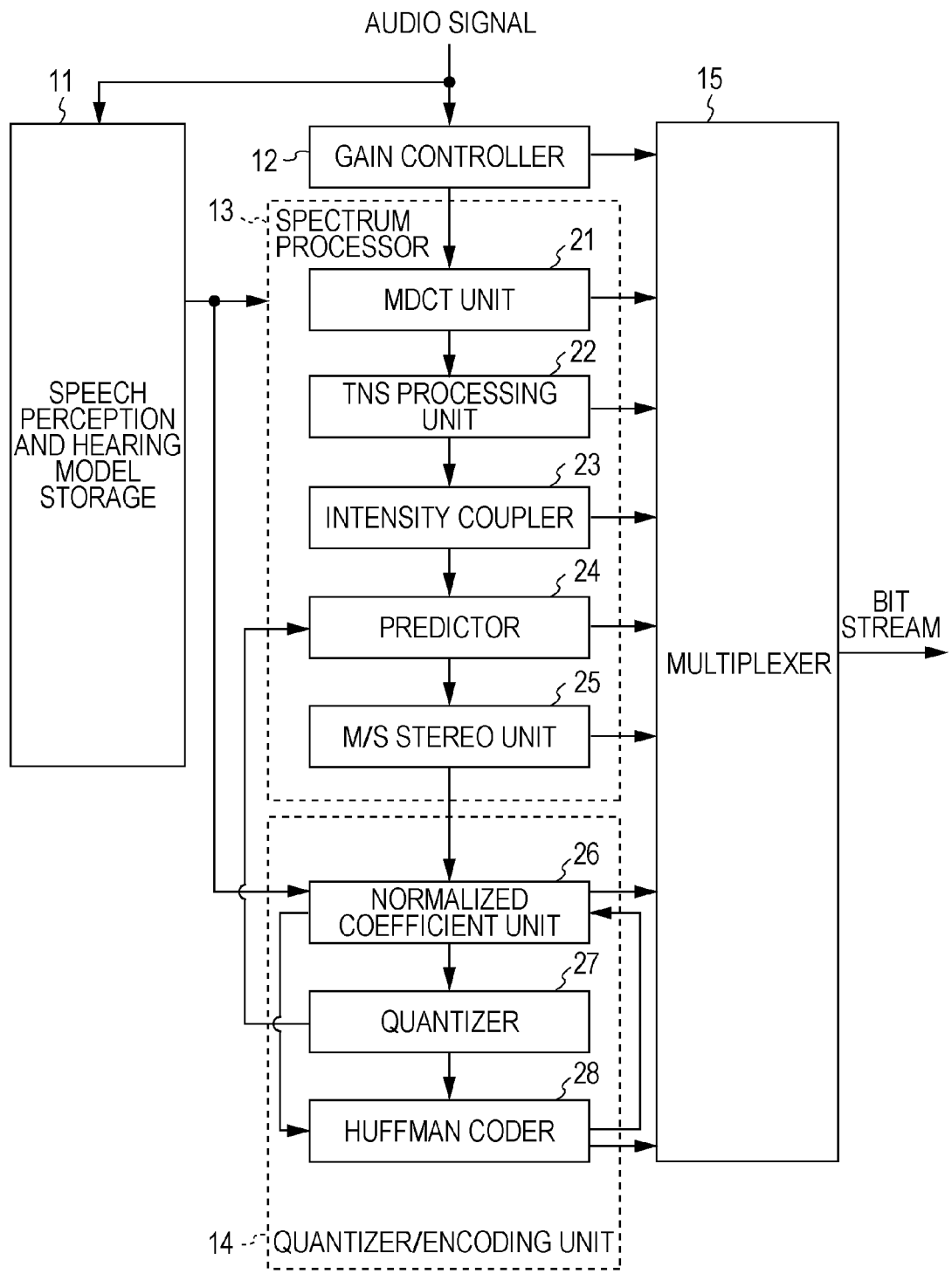
FIG. 1 illustrates a structure of an encoding apparatus of the related art.

For example, if the input value X is $(AX/2^{q/4})$ in equation (1), the power exponent Y is ¾, and the constant α is "−0.0946+0.5," the arithmetic processing apparatus 91 corresponds to the quantizer 27 illustrated in FIG. 1. In such a case, the arithmetic processing apparatus 91 non-linearly quantizes the input value X as an input audio signal.

If the input value X=0.0, the floating-point number is special. The arithmetic value P is determined as $P=0.0^Y=0$.

A power calculation process of the arithmetic processing apparatus 91 is described below with reference to a flowchart illustrated in FIG. 6.

In step S41, the logarithmic mantissa table storage unit 102 generates the logarithmic mantissa table. For example, if the interpolation processor 104 performs a quadratic interpolation as an interpolation process, the logarithmic mantissa table storage unit 102 sets the table size in the logarithmic mantissa table to be $2^N+2=SIZE+2$. The logarithmic mantissa table storage unit 102 generates the logarithmic mantissa table having a table value logtable[i] expressed in the following equation (21):

$$\text{logtable}[i] = \log_2(1+i/\text{SIZE}), i=0, \ldots, \text{SIZE}+1 \quad (21)$$

The variable i of the table value logtable[i] is determined from the mantissa $X_1$ and indicates the value of the index index1 used to identify the table value logtable[i]. The variable i is $i=0, \ldots, (\text{SIZE}+1)$. The table values logtable[i] of the number equal to the number of table size (SIZE+2) are thus prepared.

For example, if the index index1 is a value of several upper bits of the mantissa $X_1$, "$\log_2(1+i/\text{SIZE})$" in equation (21) is an approximate value of the logarithmic value $(\log_2(1+X_1/2^{23}))$ as the mantissa part of the input value X having 2 as a base with respect to the mantissa $X_1$.

The logarithmic mantissa table storage unit 102 determines the table values logtable[i] responsive to variables i of units of (SIZE+2), thereby generating and storing the logarithmic mantissa table that maps each variable i to the respective table value logtable[i].

If the interpolation processor 104 performs a linear interpolation as an interpolation process, the table size in the logarithmic mantissa table is $2^N+1=\text{SIZE}+1$. The logarithmic mantissa table composed of the table value logtable[i] in equation (21) is thus generated.

In step S42, the power of fraction table storage unit 103 generates the power of fraction table. If the interpolation processor 104 performs a quadratic interpolation as an interpolation process, the power of fraction table storage unit 103 sets the table size in the power of fraction table to be $2^N+2=\text{SIZE}+2$. The power of fraction table storage unit 103 generates the power of fraction table composed of the table value twotable[i] expressed in the following equation (22):

$$\text{twotable}[i] = 2^{(i/\text{SIZE})}, i=0, \ldots, \text{SIZE}+1 \quad (22)$$

The variable i of the table value twotable[i] is determined from the fraction $Z_{amari}$ and indicates the value of an index index2 used to identify the table value twotable[i]. The variable i is i=0, ..., (SIZE+1). The table values twotable[i] of the number equal to the table size (SIZE+2) are prepared.

For example, if the index index2 is a value of several upper bits of the fraction $Z_{amari}$, $2^{(1/SIZE)}$ in equation (22) is an approximate value of the power value $2^{Z_{amari}}$ having 2 as a base and the fraction $Z_{amari}$ as a power exponent.

The power of fraction table storage unit 103 determines the table value twotable[i] for each of the variables i of units of (SIZE+2), and generates and stores the power of fraction table with each variable i mapped to the respective table value twotable[i].

If the interpolation processor 104 performs a linear interpolation as an interpolation process, the table size in the power of fraction table is $2^N+1$=SIZE+1. The power of fraction table composed of the table value twotable[i] in equation (22) is thus generated.

It is sufficient if the process of generating the logarithmic mantissa table and the power of fraction table is performed once prior to the power calculation of the input value X. Once the logarithmic mantissa table and the power of fraction table are generated, the generated logarithmic mantissa table and power of fraction table may be used when the power calculation of the input value X is performed.

In step S43, the mantissa/exponent splitter 101 determines the mantissa $X_1$ and the exponent $X_2$ of the supplied input value X, supplies the determined mantissa $X_1$ to the interpolation processor 104, and supplies the determined exponent $X_2$ to the logarithmic calculator 105.

The mantissa part and the exponent part of the floating-point number in accordance with the IEEE754 Standard, i.e., integer type data indicating the mantissa $X_1$ and the exponent $X_2$ in equation (5) are data of the mantissa $X_1$ and the exponent $X_2$ of the input value X. In other words, a portion of the floating-point type data illustrated in FIG. 2 from the zero-th bit to the 22nd bit is the mantissa $X_1$ and a value that is obtained by subtracting a bias value from a portion from the 30th bit to the 23rd bit is the exponent $X_2$.

In step S44, the interpolation processor 104 performs the interpolation process using the mantissa $X_1$ from the mantissa/exponent splitter 101, thereby determining an interpolation value ($\log_2(1+X_1/2^{23})$) as a logarithmic value of the mantissa part of the input value X indicated in equation (6). The interpolation processor 104 thus supplies the interpolation value ($\log_2(1+X_1/2^{23})$) to the logarithmic calculator 105.

More specifically, the interpolation processor 104 calculates equation (23), thereby determining as the index index1 the upper N bits of the mantissa $X_1$ from the 22nd bit:

$$\text{index1}=X_1>>(23-N) \tag{23}$$

Figure 2:
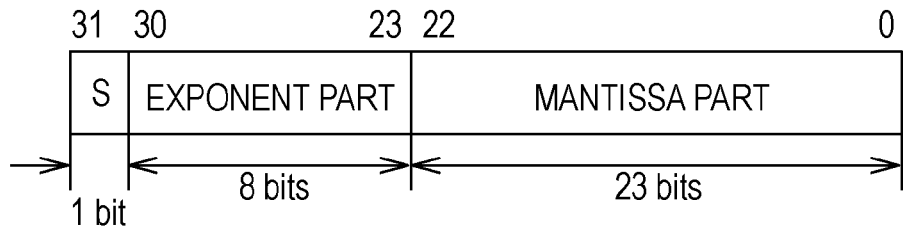
FIG. 2 illustrates a floating-point type data structure indicating a single precision floating-point number.
Figure 3:
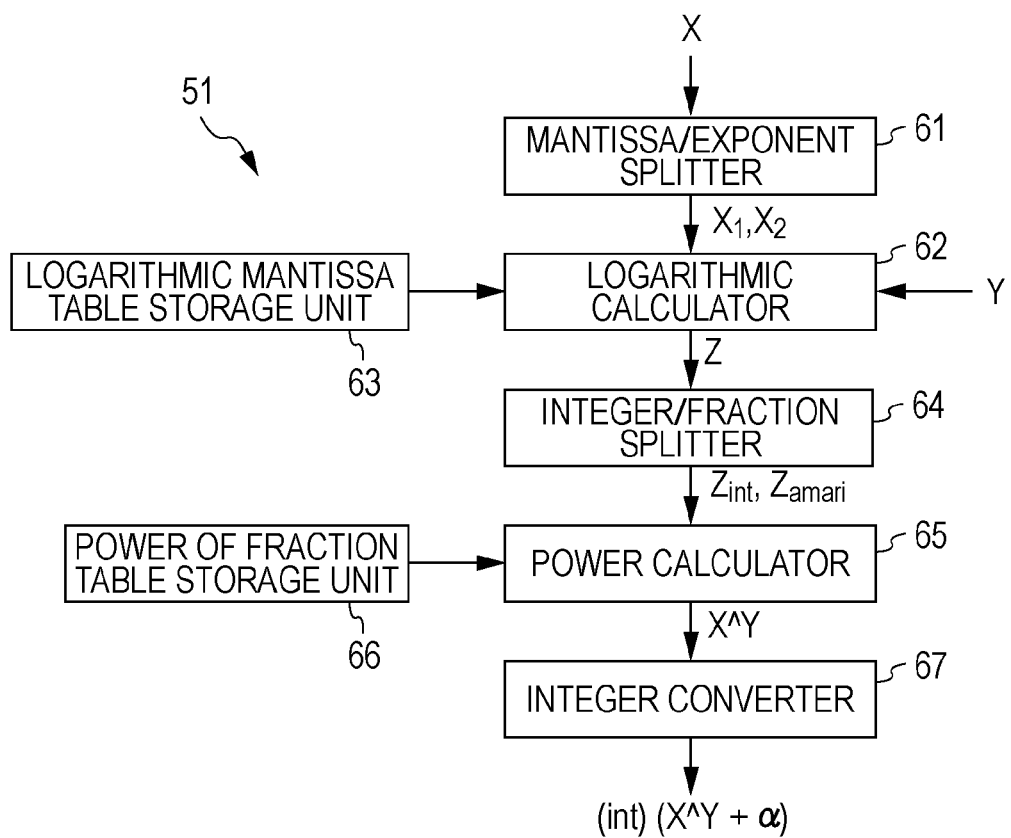
FIG. 3 illustrates an quantizing apparatus of the related art.
Figure 4:
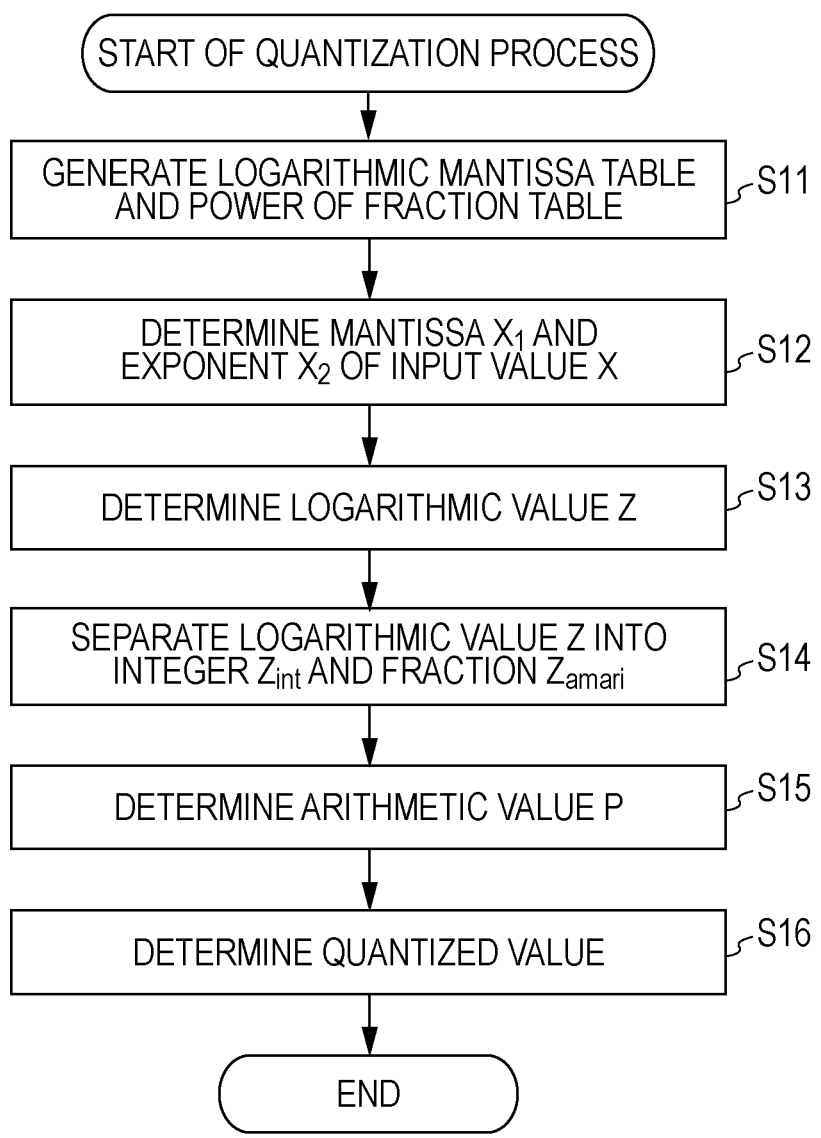
FIG. 4 is a flowchart illustrating a quantization process of the quantizing apparatus of the related art.

In equation (23), symbol ">>" denotes a right-shift operation. For example, as illustrated in FIG. 2, the mantissa $X_1$ is a 23-bit value. If the mantissa $X_1$ is right-shifted by (23−N) bits, the value of the upper N bits of the mantissa $X_1$ can be extracted.

The interpolation processor 104 calculates equation (24), thereby determining a lower-bit value $X_{h1}$ of a portion of the mantissa $X_1$ from the (22−N)-th bit to the zero-th bit.

$$X_{h1}=X_1 \& (2^{23-N}-1) \tag{24}$$

where symbol "&" denotes an AND gate operation, and the same is true in the discussion that follows. Equation (24) shows that the portion of the mantissa $X_1$ from the (22−N)-th bit to the zero-th bit results from an AND gate operation of the mantissa $X_1$ as binary data and $(2^{23-N}-1)$. In $(2^{23-N}-1)$, the value of the lower (23−N)-th bit is "1" and the other bits are "0." The AND gate operation thus extracts only the value of the lower (23−N)-th bit of the mantissa $X_1$.

Figure 7:
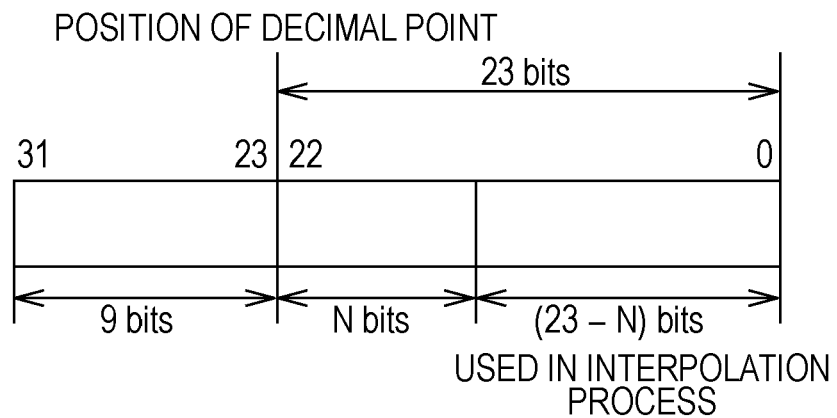
FIG. 7 illustrates a portion of the floating-point type data used to obtain a power value.

As illustrated in FIG. 7, the arithmetic processing apparatus 91 generates the index index1 based on the upper N bits from the 22nd bit, out of the 22nd bit to the zero-th bit of the floating-point number data of the mantissa part (mantissa $X_1$). The table value identified by the generated index index1 is retrieved from the logarithmic mantissa table as a logarithmic value indicating the mantissa part of the input value X with respect to the mantissa $X_1$.

Since the table value is an approximate value of the logarithmic value obtained based on the upper N bits of the mantissa $X_1$, the approximate value contains an error. The interpolation processor 104 thus obtains the table value using the upper N bits from 22nd bit of the mantissa $X_1$ and performs the interpolation process on the remaining (23−N) bits, i.e., the (22−N)-th bit to the zero-th bit of the mantissa $X_1$ in order to obtain the final logarithmic value. Without increasing the table size of the logarithmic mantissa table, the accuracy of the power calculation process is increased.

As illustrated in FIG. 7, a value resulting from extracting the bias value from a 8-bit portion of the 30th bit to the 23rd bit of the floating-point number data is extracted as integer type data of the exponent $X_2$.

Figure 6:
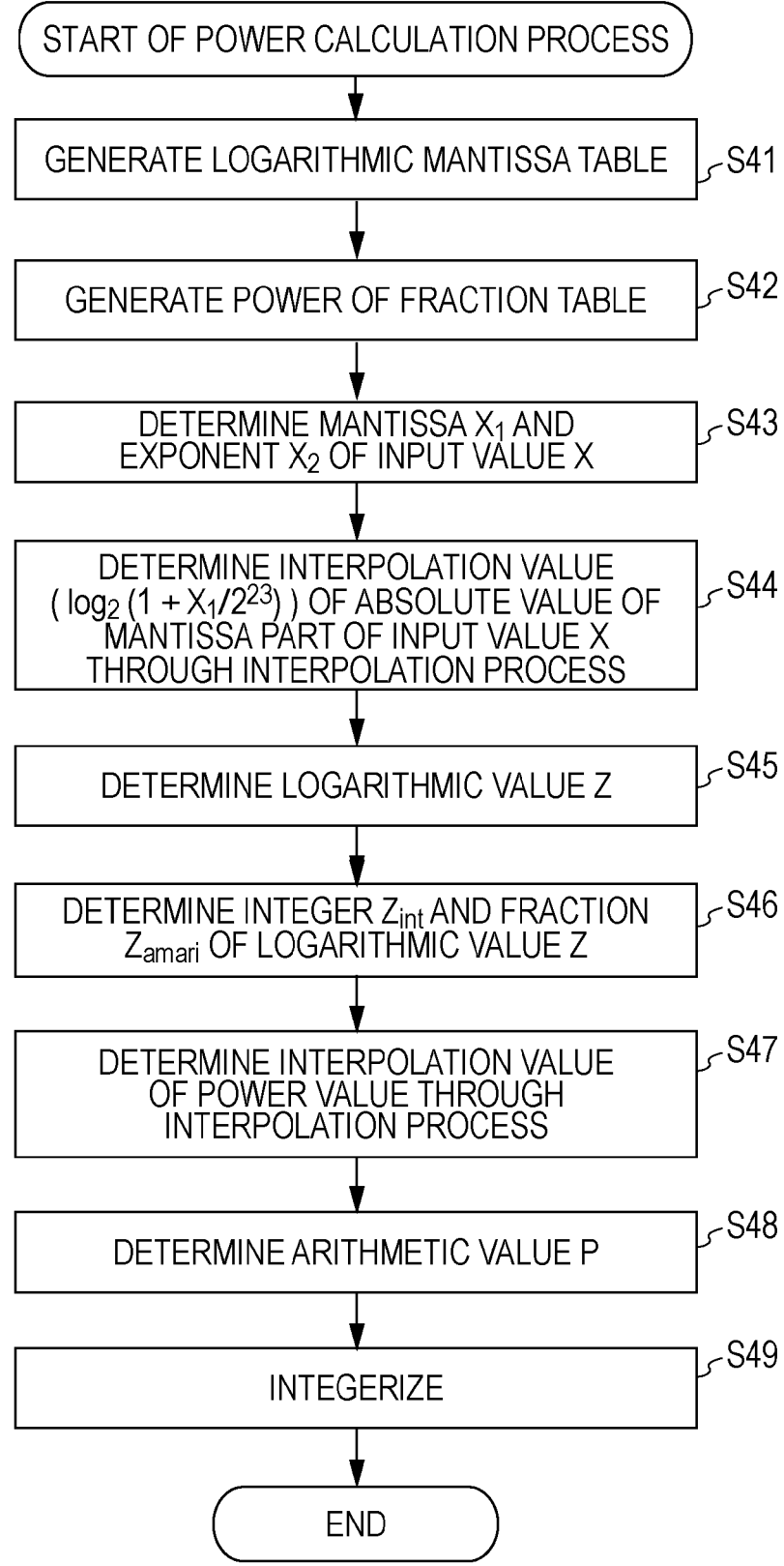
FIG. 6 is a flowchart illustrating a power calculation process.

Returning to the discussion of the flowchart illustrated in FIG. 6, the index index1 and the lower value $X_{h1}$ are determined. The interpolation processor 104 performs the interpolation process in response to the table value of the logarithmic mantissa table identified by the index index1 and the lower value $X_{h1}$.

If a linear interpolation as an interpolation process is performed, the interpolation processor 104 calculates the following equations (25) and (26) in order to determine table values $V_{10}$ and $V_{11}$ of the logarithmic values as the mantissa part of the input value X:

$$V_{10}=\text{logtable}[\text{index1}] \tag{25}$$

$$V_{11}=\text{logtable}[\text{index1}+1] \tag{26}$$

The interpolation processor 104 then retrieves from the logarithmic mantissa table of the logarithmic mantissa table storage unit 102 the logarithmic value logtable[index1] as the table value $V_{10}$ with the variable i being the index index1. Similarly, the interpolation processor 104 retrieves from the logarithmic mantissa table of the logarithmic mantissa table storage unit 102 the logarithmic value logtable[index1+1] as the table value $V_{11}$ with the variable i being the index index1+1.

The interpolation processor 104 performs the interpolation process by calculating equation (27) using the lower value $X_{h1}$, the table value $V_{10}$, and the table value $V_{11}$. The interpolation processor 104 thus determines the interpolation value ($\log_2(1+X_1/2^{23})$) of the logarithmic value of the mantissa part of the input value X having 2 as a base:

$$\log_2(1+X_1/2^{23})=a\times \text{xin}+V_{10} \tag{27}$$

where "a" and variable "xin" are respectively represented by equations (28) and (29):

$$a=V_{11}-V_{10} \tag{28}$$

$$\text{xin}=X_{h1}/2^{23-N} \tag{29}$$

Figure 8:
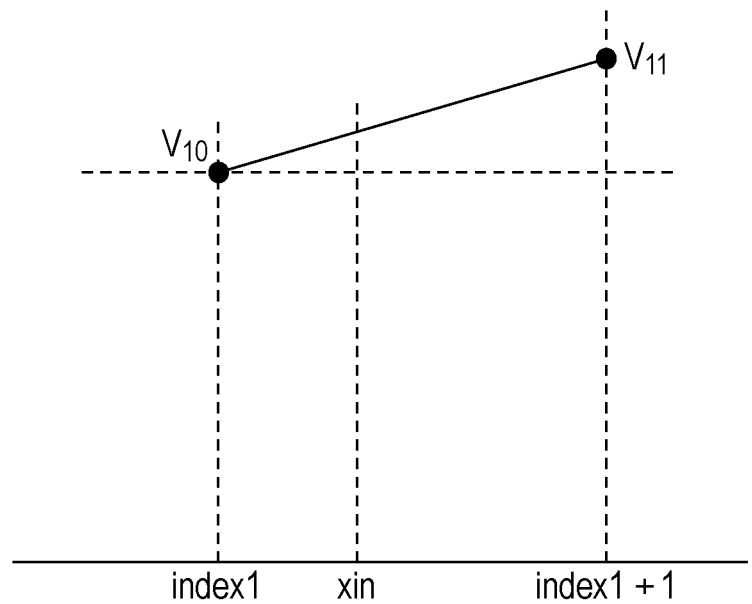
FIG. 8 illustrates a linear interpolation process.

If a linear interpolation is performed as an interpolation process, a gradient "a" of the logarithmic value with respect to the index is determined with the table value $V_{10}$ being the origin as illustrated in FIG. 8. A logarithmic value having xin as the index index1 is thus interpolated. Referring to FIG. 8, the ordinate represents a logarithmic value and the abscissa represents a value of the index index1.

If a quadratic interpolation is performed as the interpolation process, the interpolation processor 104 calculates the following equation (30) together with equations (25) and (26). The interpolation processor 104 thus determines the table values $V_{10}$ through $V_{12}$ of the logarithmic values of the mantissa part of the input value X:

$$V_{12} = \text{logtable}[\text{index1}+2] \quad (30)$$

More specifically, the interpolation processor 104 retrieves from the logarithmic mantissa table of the logarithmic mantissa table storage unit 102 the table value $V_{12}$ together with the table values $V_{10}$ and $V_{11}$. Here the logarithmic value logtable[index1+2] with the variable i being the index index1+2 is retrieved as the table value $V_{12}$.

The interpolation processor 104 performs the quadratic interpolation by calculating equation (31) using the lower value $X_{h1}$, the table value $V_{10}$ through the table value $V_{12}$. The interpolation processor 104 thus determines the interpolation value ($\log_2(1+X_1/2^{23})$) of base-2 logarithmic value as the mantissa part of the input value X:

$$\log_2(1+X_1/2^{23}) = a \times \text{xin} \times \text{xin} + b \times \text{xin} + V_{10} \quad (31)$$

where "a," "b," and "xin" are respectively represented by equations (32), (33), and (34):

$$a = 0.5(V_{12} - V_{10}) - (V_{11} - V_{10}) \quad (32)$$

$$b = (V_{11} - V_{10}) - a \quad (33)$$

$$\text{xin} = X_{h1}/2^{23-N} \quad (34)$$

Figure 9:
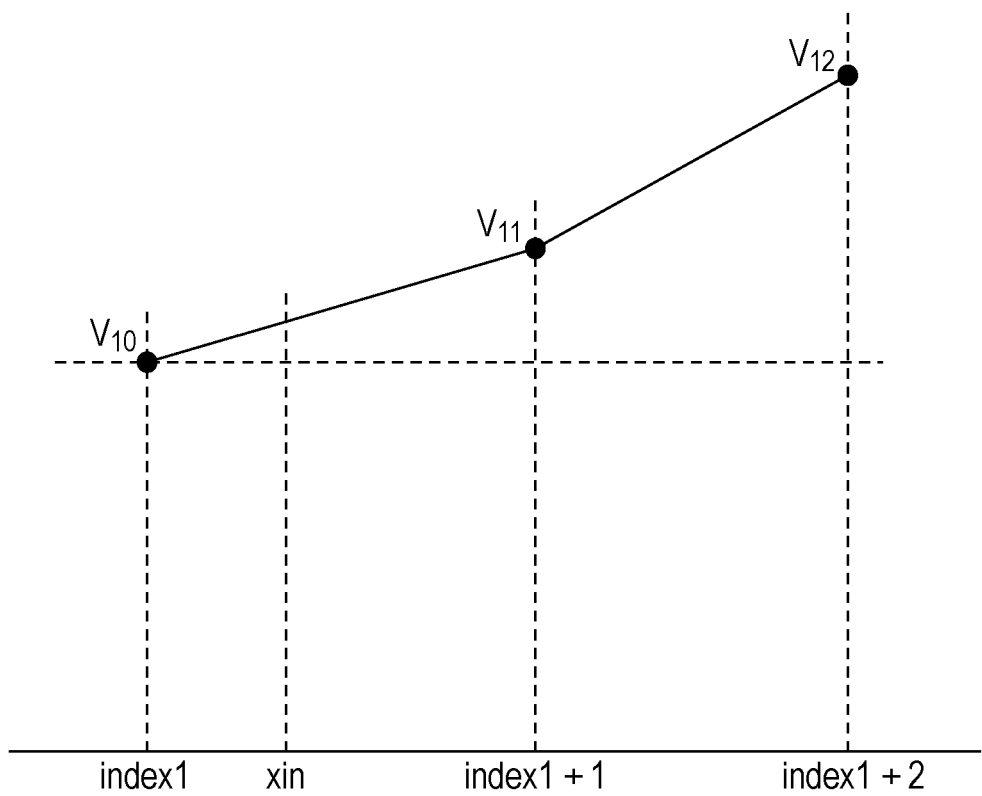
FIG. 9 illustrates a quadratic interpolation process.

When the quadratic interpolation is performed as the interpolation process, the coefficient "a" to be multiplied by square of xin as the index determined from the lower value $X_{h1}$ and the coefficient "b" to be multiplied by xin are determined as illustrated in FIG. 9 with the table value $V_{10}$ serving as the origin. A logarithmic value having the index index1 being the value of xin is thus determined as an interpolated logarithmic value. Referring to FIG. 9, the ordinate represents a logarithmic value and the abscissa represents a value of index.

If no interpolation process is performed, the interpolation processor 104 sets the table value $V_{10}$ determined in accordance with equation (25) to be the interpolation value ($\log_2(1+X_1/2^{23})$) of the logarithmic value as the mantissa part of the input value X.

The interpolation value ($\log_2(1+X_1/2^{23})$) of the logarithmic value thus determined is the final the logarithmic value ($\log_2(1+X_1/2^{23})$) of the mantissa part of the input value X and is then supplied from the interpolation processor 104 to the logarithmic calculator 105.

In step S45, the logarithmic calculator 105 calculates equation (6) based on the exponent $X_2$ from the mantissa/exponent splitter 101, the logarithmic value ($\log_2(1+X_1/2^{23})$) from the interpolation processor 104, and the supplied power exponent Y, thereby determining the logarithmic value Z. The logarithmic value Z of the arithmetic value P having 2 as a base is thus determined. The logarithmic calculator 105 supplies the calculated logarithmic value Z to the integer/fraction splitter 106. The logarithmic value Z is floating-point number type, binary data.

In step S46, the integer/fraction splitter 106 determines the integer $Z_{int}$ and the fraction $Z_{amari}$ of the logarithmic value Z from the logarithmic calculator 105. The integer/fraction splitter 106 then supplies the integer $Z_{int}$ to the power calculator 107 and the fraction $Z_{amari}$ to the interpolation processor 104.

More specifically, the integer/fraction splitter 106 determines the integer $Z_{int}$ using the logarithmic value Z in accordance with the following equation (35):

$$Z_{int} = \begin{cases} (\text{int})Z & Z \geq 0 \\ (\text{int})Z - 1 & Z < 0 \end{cases} \quad (35)$$

If the logarithmic value Z is equal to or greater than zero, the integer part of the logarithmic value Z is extracted and treated as the integer $Z_{int}$. If the logarithmic value Z is smaller than zero, the integer part of the logarithmic value Z is extracted. A value that is obtained by subtracting 1 from the integer part is treated as the integer $Z_{int}$.

The integer/fraction splitter 106 also determines the fraction $Z_{amari}$ using the logarithmic value Z in accordance with the following equation (36):

$$Z_{amari} = (\text{int})((Z - (\text{int})Z) \times 2^{23}) \quad (36)$$

In equation (36), a value (difference) obtained by subtracting the integer part of the logarithmic value Z from the logarithmic value Z is multiplied by $2^{23}$, and the integer part of the resulting product becomes the fraction $Z_{amari}$. In other words, the determination of the difference between the logarithmic value Z and the integer part of the logarithmic value Z results in the value of the fraction part of the logarithmic value Z. The resulting fraction part is multiplied by $2^{23}$ and an integer part is extracted from the resulting product. In this way, the fraction part of the logarithmic value Z is converted to a fixed-point number having the decimal point placed at the 23rd bit, i.e., fixed-point type data.

In step S47, the interpolation processor 104 performs the interpolation process based on the fraction $Z_{amari}$ from the integer/fraction splitter 106, thereby determining an interpolation value of a power value of 2 to the power of the fraction $Z_{amari}$ as a power exponent.

More specifically, the interpolation processor 104 calculates equations (37) and (38), thereby extracting as the index index2 the value of the upper N bits of the fixed-point fraction $Z_{amari}$ above the 22nd bit:

$$\text{index2}' = Z_{amari} \gg (23-N) \quad (37)$$

$$\text{index2} = \text{index2}' \& (\text{SIZE}-1) \quad (38)$$

In equation (37), symbol ">>" denotes a right-shift operation, and symbol "&" denotes an AND gate operation.

The interpolation processor 104 extracts as the index index2' the value of the upper bits of the fraction $Z_{amari}$ above the (23−N)-th bit by right-shifting the fraction $Z_{amari}$ by (23−N) bits. The calculation of equation (36) shows that the fraction $Z_{amari}$ is a fixed-point number with the decimal point at the 23rd bit. If the fraction $Z_{amari}$ is right-shifted by (23−N) bits, the value of the upper bits of the fraction part of the fraction $Z_{amari}$ above the (23−N)-th bit is extracted. The interpolation processor 104 AND gates the index index2' thus obtained and (SIZE−1), thereby determining the N-bit index index2.

Moreover, the interpolation processor 104 calculates the following equation (39), thereby determining a lower value $X_{h2}$ as the value of a portion from the (22−N)-th bit to the zero-th bit:

$$X_{h2} = Z_{amari} \& (2^{23-N} - 1) \quad (39)$$

In equation (39), as in equation (24), an AND gate operation is performed on the binary data fraction $Z_{amari}$ and $(2^{23-N} - 1)$, extracting a portion of the fraction $Z_{amari}$ of from the (22−N)-th bit to the zero-th bit.

When the index index2 and the lower value $X_{h2}$ are determined, the interpolation processor 104 performs the interpolation process on the table value of the power of fraction table identified by the index index2 and the lower value $X_{h2}$.

If a linear interpolation is performed as the interpolation process, the interpolation processor 104 calculates equations (40) and (41), thereby determining table values $V_{20}$ and $V_{21}$ of the power value of 2 to the power of the fraction $Z_{amari}$ as a power exponent:

$$V_{20}=\text{twotable}[\text{index2}] \tag{40}$$

$$V_{21}=\text{twotable}[\text{index2}+1] \tag{41}$$

More specifically, the interpolation processor 104 retrieves from the power of fraction table of the power of fraction table storage unit 103 as the table value $V_{20}$ and $V_{21}$ the table values twotable [index2] and twotable [index2+1] with the indexes index2 and index2+1 serving as the variable i. The two close table values $V_{20}$ and $V_{21}$ of the index index2 are thus retrieved from the power of fraction table.

The AND gate operation represented by equation (38) and the subtraction operation of subtracting 1 from the integer of a negative logarithmic value Z in equation (35) are identical to the following operation. More specifically, the operations represented by equations (38) and (35) are identical to an operation in which 1 is subtracted from the integer $Z_{int}$ of the logarithmic value Z and 1 is added to the fraction $Z_{amari}$ of the logarithmic value Z if the fraction $Z_{amari}$ in the logarithmic value Z=(the integer $Z_{int}$+the fraction $Z_{amari}$) is negative.

Such an operation reduces the number of conditional branches that are used when a table value (power value) identified by the index index2 is retrieved from the power of fraction table. The table value is thus obtained faster.

Japanese Unexamined Patent Application Publication No. 2004-172700 discloses a technique of reducing the conditional branches in a table lookup. According to the disclosure, a table is used with a power exponent split into a fraction and an integer when a power of 2 is calculated. If the power exponent is negative, 1 is added to the fraction, and 1 is subtracted from the integer.

The lower value $X_{h2}$, the table value $V_{20}$, and the table value $V_{21}$ are thus determined. The interpolation processor 104 performs the interpolation process by calculating equation (42) based on the lower value $X_{h2}$, the table value $V_{20}$, and the table value $V_{21}$. The interpolation processor 104 thus determines the interpolation value $(2^{\wedge}Z_{amari})$ of 2 to the power of the fraction $Z_{amari}$ as a power exponent:

$$2^{Z_{amari}}=a\times\text{xin}+V_{20} \tag{42}$$

where "a" and variable "xin" are respectively represented by equations (43) and (44):

$$a=V_{21}-V_{20} \tag{43}$$

$$\text{xin}=X_{h2}/2^{23-N} \tag{44}$$

If a linear interpolation is performed as the interpolation process, the gradient "a" of the power value is determined with reference to the index with the table value $V_{20}$ serving as the origin in the same manner as illustrated in FIG. 8. A power value having xin as the value of the index index2 is thus determined as an interpolation power value.

If a quadratic interpolation is performed as the interpolation process, the interpolation processor 104 calculates the following equation (45) together with equations (40) and (41). The interpolation processor 104 thus determines the table value $V_{20}$ through the table value $V_{22}$ of the power value of 2 to the power the fraction $Z_{amari}$ as a power exponent:

$$V_{22}=\text{twotable}[\text{index2}+2] \tag{45}$$

The interpolation processor 104 retrieves, together with the table value $V_{20}$ and the table value $V_{21}$, the table value twotable[index2+2] with the index index2+2 as the variable i as the table value $V_{22}$ from the power of fraction table of the power of fraction table storage unit 103.

The interpolation processor 104 performs the quadratic interpolation process by calculating equation (46) using the lower value $X_{h2}$, the table value $V_{20}$ through the table value $V_{22}$. The interpolation processor 104 thus determines the interpolation value $(2^{\wedge}Z_{amari})$ of the power value of 2 to the power of the fraction $Z_{amari}$ as a power exponent:

$$2^{Z_{amari}}=a\times\text{xin}\times\text{xin}+b\times\text{xin}+V_{20} \tag{46}$$

where "a," "b," and "xin" are respectively represented by equations (47)-(49):

$$a=0.5(V_{22}-V_{20})-(V_{21}-V_{20}) \tag{47}$$

$$b=(V_{21}-V_{20})-a \tag{48}$$

$$\text{xin}=X_{h2}/2^{23-N} \tag{49}$$

When the quadratic interpolation is performed as the interpolation process, the coefficient "a" to be multiplied by the square of the value win determined from the lower value $X_{h2}$ and the coefficient "b" to be multiplied by the value xin are determined in the same manner as illustrated in FIG. 9 with the table value $V_{20}$ serving as the origin. A power value having xin as the index index2 is thus determined as an interpolation value.

If no interpolation process is performed, the interpolation processor 104 sets the table value $V_{20}$ obtained through equation (40) as the interpolation value $(2^{\wedge}Z_{amari})$ as a power value of 2 to the power of the fraction $Z_{amari}$ as a power exponent.

The interpolation value $(2^{\wedge}Z_{amari})$ thus determined as the power value is supplied from the interpolation processor 104 to the power calculator 107 as the final power value of 2 to the power of the fraction $Z_{amari}$ as a power exponent.

In step S48, the power calculator 107 calculates the arithmetic value P based on the power value $(2^{\wedge}Z_{amari})$ from the interpolation processor 104 and the integer $Z_{int}$ from the integer/fraction splitter 106.

More specifically, the power calculator 107 calculates equation (50) using the integer $Z_{int}$, thereby determining the power value $(2^{\wedge}Z_{int})$ of a power value of 2 to the power of the integer $Z_{int}$ as a power exponent:

$$2^{Z_{int}}=(Z_{int}+127)<<23 \tag{50}$$

In equation (50), symbol "<<" denotes a left-shift operation. More specifically, the power calculator 107 adds the bias component "127" to the integer $Z_{int}$ and then left-shifts by 23 bits the sum in order to cause the power value $(2^{\wedge}Z_{int})$ to be data in a floating-point type format defined by the IEEE754 Standard.

The left-shift operation is performed because the exponent part of the floating-point number is a portion of the floating-point type data from the 30th bit to the 23rd bit. The floating-point type data having "$Z_{int}+127$" as the exponent part thus results.

The power value $(2^{\wedge}Z_{amari})$ and the power value $(2^{\wedge}Z_{int})$ are obtained. The power calculator 107 substitutes these power values into equation (51), thereby calculating the arithmetic value P. The resulting arithmetic value P is then supplied to the integer converter 108. The resulting arithmetic value P is the floating-point type data:

$$P=2^{Z_{amari}}\times 2^{Z_{int}} \tag{51}$$

In step S49, the integer converter 108 integerizes the arithmetic value P and outputs the integerized arithmetic value P. The power calculation process thus ends.

More specifically, the integer converter 108 calculates equation (52), thereby determining an integer part of a value resulting from adding the constant α to the arithmetic value P. The resulting value as the integerized arithmetic value P is then provided as an output value:

$$\text{Output value} = (\text{int})(P+\alpha) \tag{52}$$

The arithmetic processing apparatus 91 performs the interpolation process based on the table values from the logarithmic mantissa table and the power of fraction table, and then determines the arithmetic value P from the logarithmic value and the power value obtained through the interpolation process.

The determination of the arithmetic value P through the interpolation process easily increases the accuracy of the power calculation without increasing the table size of the logarithmic mantissa table and the power of fraction table. A memory capacity of a memory storing the table for the power calculation is reduced, and the accuracy of the power calculation is easily increased.

The inventors of this invention evaluated the accuracy of the power calculation of the arithmetic processing apparatus 91 according to the relative error mean value T determined by calculating equation (20). FIG. 10 lists the evaluation results.

FIG. 10 lists the relative error mean values T of the interpolated and non-interpolated values of the logarithmic mantissa table and the power of fraction table with N in the table size of each of the logarithmic mantissa table and the power of fraction table being 8 (i.e., SIZE=256) and L=8192 pieces of data.

Label "power (no interpolation)" indicates that a value in the power of fraction table without being interpolated is used to calculate the arithmetic value P. Label "power (linear interpolation)" indicates that a value in the power of fraction table is linearly interpolated and used to calculate the arithmetic value P. Label "power (quadratic interpolation)" indicates that a value in the power of fraction table is quadratically interpolated and used to calculate the arithmetic value P.

Similarly, "logarithm (no interpolation)" indicates that a value in the logarithmic mantissa table without being interpolated is used to calculate the arithmetic value P. Label "logarithm (linear interpolation)" indicates that a value in the logarithmic mantissa table is linearly interpolated and used to calculate the arithmetic value P. Label "logarithm (quadratic interpolation)" indicates that a value in the logarithmic mantissa table is quadratically interpolated and used to calculate the arithmetic value P.

FIG. 10 illustrates that the interpolation process performed on at least one of the value in the logarithmic mantissa table and the value in the power of fraction table increases the calculation accuracy of the power value (more in detail, an integer of the power value). For example, if the linear interpolation is performed on both the value in the logarithmic mantissa table and the value in the power of fraction table, the relative error mean value T is $T=1.71\times10^{-6}$. If the quadratic interpolation is performed on both the value in the logarithmic mantissa table and the value in the power of fraction table, the relative error mean value T is $T=1.99\times10^{-7}$.

The accuracy with one of the linear interpolation and the quadratic interpolation performed on both the table values provides a substantially increased accuracy in comparison with the quantizing apparatus 51 in the related art that provides the relative error mean value $T=5.10\times10^{-6}$ with N=16 (i.e., the table size=65536). More specifically, even with a smaller table size, a higher calculation accuracy results.

FIG. 11 lists the relative error mean values T obtained when both the value of the logarithmic mantissa table and the value of the power of fraction table are not interpolated, are linearly interpolated, and are quadratically interpolated with N=1, ..., 8 (i.e., with the table size of each of the logarithmic mantissa table and the power of fraction table being SIZE=2, ..., 256).

As illustrated in FIG. 11, the column of "table size" indicates the SIZE number of the table size. Labels "no interpolation," "linear interpolation," and "quadratic interpolation" respectively indicate that the value in the logarithmic mantissa table and the value in the power of fraction table are not interpolated, that the value in the logarithmic mantissa table and the value in the power of fraction table are linearly interpolated, and that the value in the logarithmic mantissa table and the value in the power of fraction table are quadratically interpolated.

Referring to FIG. 11, the linear interpolation performed with a table size of "8" and the quadratic interpolation performed with a table size of "4" result in approximately the same accuracy level as no interpolation performed with a table size of "256."

More specifically, if no interpolation is performed with a table size of "256," the relative error mean value T is $T=5.44\times10^{-3}$. If the linear interpolation is performed with a table size of "8," the relative error mean value is $T=1.74\times10^{3}$. If the quadratic interpolation is performed with a table size of 14, the relative error mean value T is $T=1.70\times10^{3}$. The arithmetic processing apparatus 91 can perform a high accuracy power calculation process by performing the interpolation process with a small table size (table count).

In the above discussion, the table size of the logarithmic mantissa table is equal to the table size of the power of fraction table. The table size may be different depending on the accuracy level for the power calculation. If the table size is modified, the bit position at the interpolation process performed by the interpolation processor 104, namely, the magnitude of one of the lower value $X_{h1}$ and the lower value $X_{h2}$ may be modified in response to the table size.

In the above discussion, the interpolation process is performed on both the value in the logarithmic mantissa table and the value in the power of fraction table. The interpolation process may be performed on one of the tables depending on an amount of process of the interpolation process and an accuracy level of the interpolation process. Different interpolation processes may be performed on different tables. The interpolation process is not limited to the linear interpolation and the quadratic interpolation. A cubic or higher polynomial interpolation, or a spline interpolation may be performed.

In the above discussion, the input value X is represented in binary, and the arithmetic value P is determined as a pair of a logarithm with 2 as a base, and a power of 2. If the input value X is represented by a base-M number, the arithmetic value P is determined with a pair of a logarithm with M as a base (the logarithmic value Z), and a power of M. In such a case, the logarithmic value $Z=\log_M P$ and the arithmetic value $P=(M^{\wedge}Z_{int})\times(M^{\wedge}Z_{amari})$.

Second Embodiment

Figure 12:
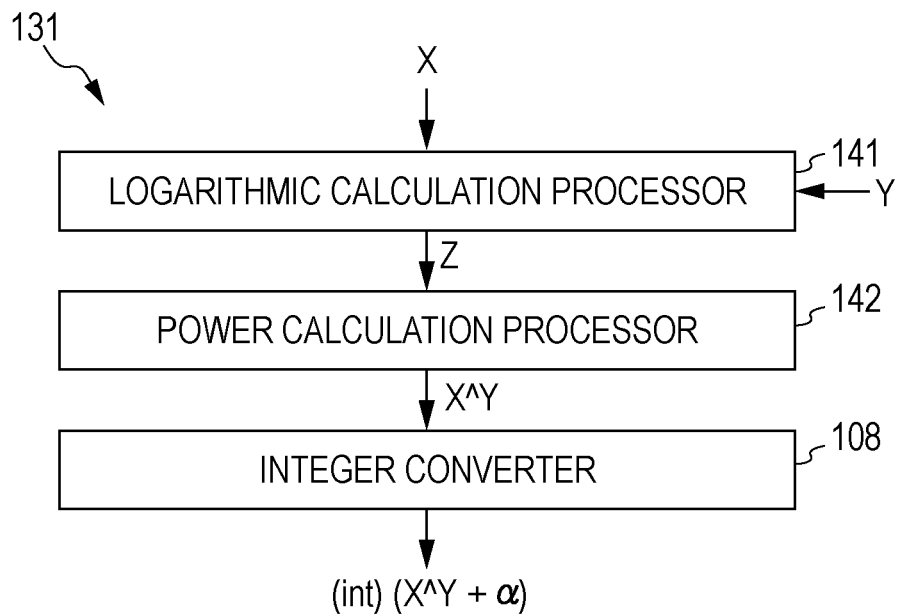
FIG. 12 illustrates another arithmetic processing apparatus.

FIG. 12 is a block diagram of an arithmetic processing apparatus 131 in accordance with a second embodiment of the present invention. Elements identical to those illustrated in FIG. 5 are designated with the same reference numerals and the discussion thereof is omitted as appropriate.

The arithmetic processing apparatus 131 includes logarithmic calculation processor 141, power calculation processor 142, and integer converter 108. In the arithmetic processing apparatus 131, the logarithmic calculation processor 141 receives the input value X and the power exponent Y.

The logarithmic calculation processor 141 calculates the logarithmic value Z using the input value X and the power exponent Y, and supplies the logarithmic value Z to the power calculation processor 142. The power calculation processor 142 calculates the arithmetic value P from the logarithmic value Z from the logarithmic calculation processor 141, and then supplies the arithmetic value P to the integer converter 108.

The power calculation process of the arithmetic processing apparatus 131 is described below with reference to a flowchart illustrated in FIG. 13.

In step S71, the logarithmic calculation processor 141 performs the logarithmic calculation process to calculate the logarithmic value Z and supplies the logarithmic value Z to the power calculation processor 142. Through the logarithmic calculation process, as will be described in detail later, equation (6) is calculated to determine the logarithmic value Z.

In step S72, the power calculation processor 142 performs an arithmetic value calculation process, thereby determining the arithmetic value P. The power calculation processor 142 then supplies the arithmetic value P to the integer converter 108. Through the arithmetic value calculation process to be discussed in detail later, equation (7) is calculated to determine the arithmetic value P.

Step S73 completes the power calculation process. The operation in step S73 is identical to that in step S49 of FIG. 6, and the discussion thereof is omitted here.

Several implementation methods of the logarithmic calculation processor 141 performing the logarithmic calculation process are contemplated.

For example, the logarithmic calculation processor 141 calculates the logarithmic value Z in accordance with equation (6). The range of value taken by the mantissa part $(1+X_1/2^{23})$ of the input value X in the logarithmic value Z is $1.0 \le (1+X_1/2^{23}) < 2.0$. The base of the logarithm calculation by equation (6) is "2." A process amount for calculating the arithmetic value $(\log_2(1+X_1/2^{23}))$ in equation (6) is not so large.

If the logarithmic calculation processor 141 is constructed of an arithmetic device that performs a base-2 logarithmic calculation, the logarithmic calculation processor 141 can calculate the logarithmic value Z at a high speed. The use of a dedicated arithmetic device calculating the arithmetic value $(\log_2(1+X_1/2^{23}))$ in equation (6) allows the logarithmic calculation processor 141 to be simpler in structure than when a general-purpose arithmetic device is used.

Figure 14:
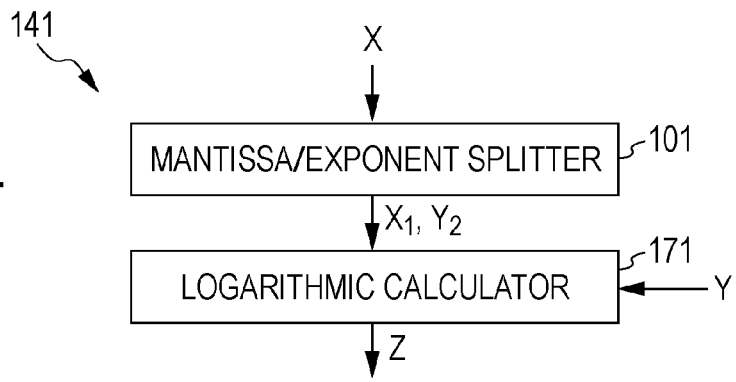
FIG. 14 illustrates a logarithmic calculation processor.

In such a case, the logarithmic calculation processor 141 has the structure illustrated in FIG. 14. In FIG. 14, elements identical to those illustrated in FIG. 5 are designated with the same reference numerals, and the discussion thereof is omitted as appropriate.

The logarithmic calculation processor 141 illustrated in FIG. 14 includes mantissa/exponent splitter 101 and logarithmic calculator 171. In the logarithmic calculation processor 141, the mantissa/exponent splitter 101 receives the input value X and the logarithmic calculator 171 receives the power exponent Y.

The logarithmic calculator 171 includes an arithmetic device for logarithmic calculation. The arithmetic device in the logarithmic calculator 171 determines the logarithmic value Z in response to the supplied power exponent Y, and the mantissa $X_1$ and the exponent $X_2$ from the mantissa/exponent splitter 101. The logarithmic calculator 171 then supplies the logarithmic value Z to the power calculation processor 142 illustrated in FIG. 12.

Figure 13:
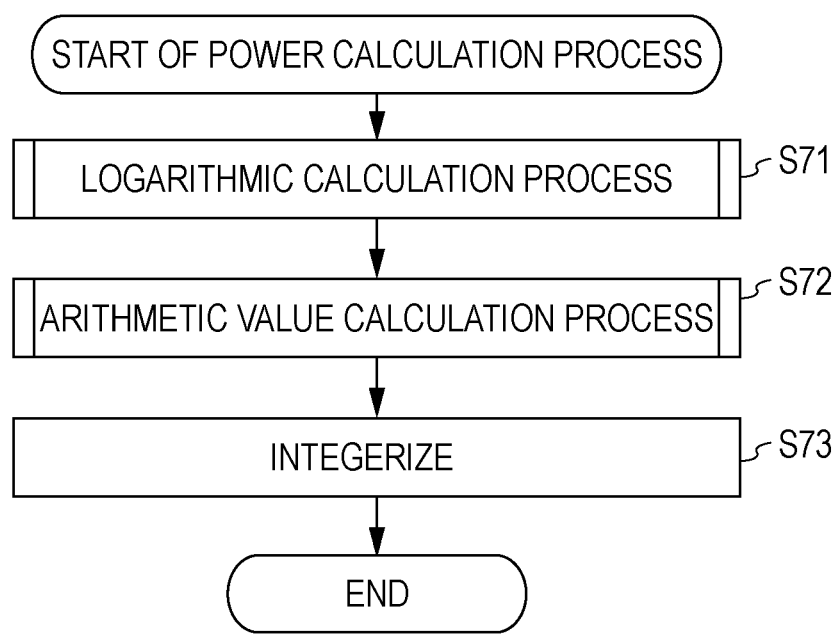
FIG. 13 is a flowchart illustrating a power calculation process.
Figure 15:
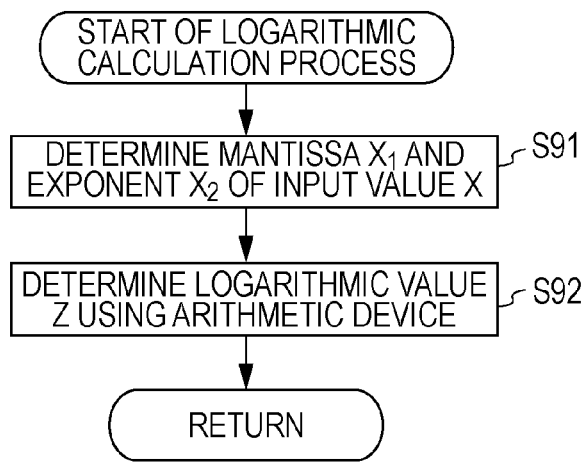
FIG. 15 is a flowchart illustrating a logarithmic calculation process of the logarithmic calculation processor.

The logarithmic calculation process corresponding to the operation in step S71 illustrated in FIG. 13 is described with reference to a flowchart of FIG. 15. The operation in step S91 is identical to the operation in step S43 of FIG. 6, and the discussion thereof is omitted here.

In step S92, the logarithmic calculator 171 calculates equation (6) with the arithmetic device thereof in response to the supplied power exponent Y, and the mantissa $X_1$ and the exponent $X_2$ from the mantissa/exponent splitter 101. The logarithmic calculator 171 thus determines the logarithmic value Z.

More specifically, using the internal arithmetic device, the logarithmic calculator 171 calculates from the mantissa $X_1$ from the mantissa/exponent splitter 101 the logarithmic value $\log_2(1+X_1/2^{23})$ as the mantissa part of the input value X having 2 as a base. The mantissa $X_1$ is integer type data having the decimal point at the 23rd bit. The mantissa $X_1$ is thus converted into floating-point type data, and then undergoes the logarithmic calculation.

The logarithmic calculator 171 substitutes the determined logarithmic value, the supplied power exponent Y, and the exponent $X_2$ from the mantissa/exponent splitter 101 for those in equation (6), thereby determining the logarithmic value Z. The resulting logarithmic value Z is then supplied to the power calculation processor 142. When the logarithmic value Z is supplied to the power calculation processor 142, the logarithmic calculation process ends. Processing then proceeds to step S72 in FIG. 13.

The logarithmic calculation processor 141 calculates the logarithmic value Z using the arithmetic device in this way. This arrangement eliminates the logarithmic mantissa table, thereby allowing the logarithmic calculation processor 141 to be miniaturized.

Figure 16:
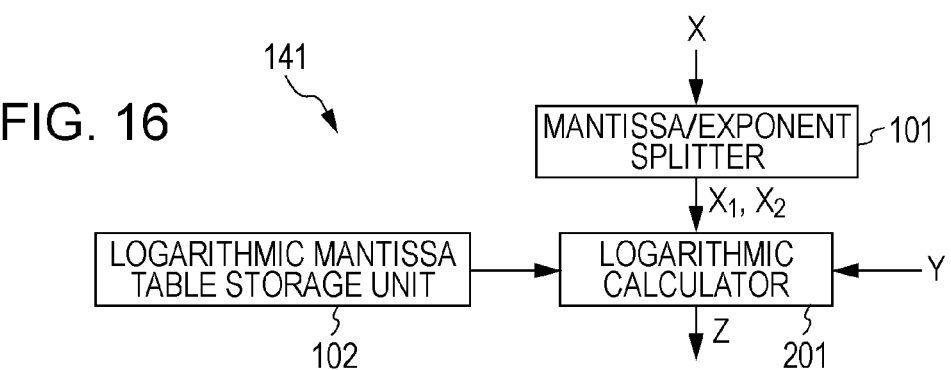
FIG. 16 illustrates another logarithmic calculation processor.

FIG. 14 illustrates the calculation process in which the logarithmic calculation processor 141 uses the arithmetic device. The logarithmic mantissa table may be used to determine the logarithmic value Z. In such a case, the logarithmic calculation processor 141 is constructed as illustrated in FIG. 16. In FIG. 16, elements identical to those in FIG. 5 are designated with the same reference numerals and the discussion thereof is omitted as appropriate.

The logarithmic calculation processor 141 illustrated in FIG. 16 includes mantissa/exponent splitter 101, logarithmic mantissa table storage unit 102, and logarithmic calculator 201. In the logarithmic calculation processor 141, the mantissa/exponent splitter 101 receives the input value X and the logarithmic calculator 201 receives the power exponent Y.

The logarithmic calculator 201 calculates the logarithmic value Z by referencing the logarithmic mantissa table of the logarithmic mantissa table storage unit 102 in accordance with the supplied power exponent Y, and the mantissa $X_1$ and the exponent $X_2$ from the mantissa/exponent splitter 101. The logarithmic calculator 201 then supplies the resulting logarithmic value Z to the power calculation processor 142 illustrated in FIG. 12.

Figure 17:
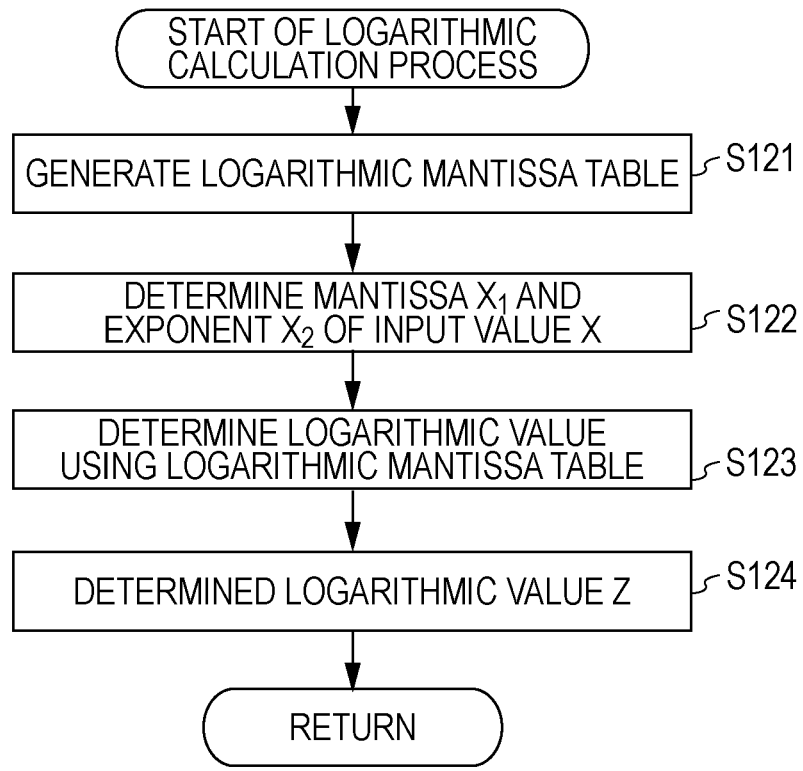
FIG. 17 is a flowchart illustrating a logarithmic calculation process of the logarithmic calculation processor.

The logarithmic calculation process corresponding to the operation performed in step S71 of FIG. 13 is described below with reference to flowchart of FIG. 17.

The operations performed in steps S121 and S122 are respectively identical to the operations performed in steps S41 and S43 illustrated in FIG. 6, and the discussion thereof is omitted herein.

However, in step S121, the logarithmic mantissa table storage unit 102 sets the table size of the logarithmic mantissa table to be $2^N$=SIZE, and generates the logarithmic mantissa table composed of the table value logtable[i] represented by equation (21). Here, the variable i=0, ..., (SIZE−1).

The logarithmic mantissa table is generated, and the mantissa $X_1$ and the exponent $X_2$ of the input value X are determined. In step S123, the logarithmic calculator 201 calculates the logarithmic value ($\log_2(1+X_1/2^{23})$) as the mantissa part of the input value X using the logarithmic mantissa table of the logarithmic mantissa table storage unit 102 in accordance with the mantissa $X_1$ from the mantissa/exponent splitter 101.

More specifically, the logarithmic calculator 201 calculates equation (23) using the mantissa $X_1$, thereby determining as the index index1 the value of the upper N bits of the mantissa $X_1$ from the 22nd bit. Using the index index1, the logarithmic calculator 201 calculates the logarithmic value of the mantissa part of the input value X in accordance with equation (53):

$$\log_2(1+X_1/2^{23})=\text{logtable}[\text{index1}] \quad (53)$$

More specifically, the logarithmic calculator 201 handles the value of the upper N bits extracted from the mantissa $X_1$ as the index index1, and retrieves the table value logtable[i] with the variable i being the index index1 from the logarithmic mantissa table of the logarithmic mantissa table storage unit 102. The retrieved table value logtable[index1] is the logarithmic value ($\log_2(1+X_1/2^{23})$) of the mantissa part of the input value X.

In step S124, the logarithmic calculator 201 substitutes the exponent $X_2$ from the mantissa/exponent splitter 101, the supplied power exponent Y, and the calculated logarithmic value ($\log_2(1+X_1/2^{23})$) for those in equation (6), thereby calculating the logarithmic value Z. The calculated logarithmic value Z is then supplied to the power calculation processor 142. The determination of the logarithmic value Z completes the logarithmic calculation process. Processing proceeds to step S72 in FIG. 13.

The logarithmic calculation processor 141 calculates in this way the logarithmic value Z using the logarithmic mantissa table.

Figure 18:
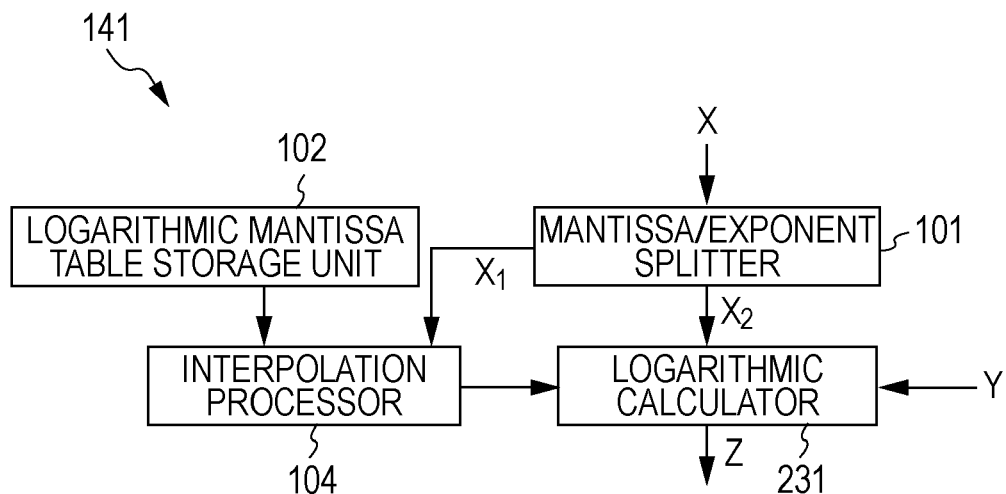
FIG. 18 illustrates another logarithmic calculation processor.

Optionally, the interpolation process may be performed on the table value obtained from the logarithmic mantissa table in order to reduce the table size of the logarithmic mantissa table. In such a case, the logarithmic calculation processor 141 is constructed as illustrated in FIG. 18. In FIG. 18, elements identical those illustrated in FIG. 5 are designated with the same reference numerals and the discussion thereof is omitted as appropriate.

The logarithmic calculation processor 141 illustrated in FIG. 18 includes mantissa/exponent splitter 101, logarithmic mantissa table storage unit 102, interpolation processor 104, and logarithmic calculator 231. In the logarithmic calculation processor 141, the mantissa/exponent splitter 101 receives the input value X, and the logarithmic calculator 231 receives the power exponent Y.

The mantissa/exponent splitter 101 determines the mantissa $X_1$ and the exponent $X_2$ of the input value X, supplies the mantissa $X_1$ to the interpolation processor 104 and the exponent $X_2$ to the logarithmic calculator 231. The interpolation processor 104 performs the interpolation process on the logarithmic mantissa table of the logarithmic mantissa table storage unit 102 using the mantissa $X_1$ from the mantissa/exponent splitter 101, thereby determining the logarithmic value of the mantissa part of the input value X. The resulting logarithmic value is supplied to the logarithmic calculator 231.

The logarithmic calculator 231 calculates the logarithmic value Z using the exponent $X_2$ from the mantissa/exponent splitter 101, the supplied power exponent Y, and the logarithmic value from the interpolation processor 104. The resulting logarithmic value Z is then supplied to the power calculation processor 142 illustrated in FIG. 12.

Figure 19:
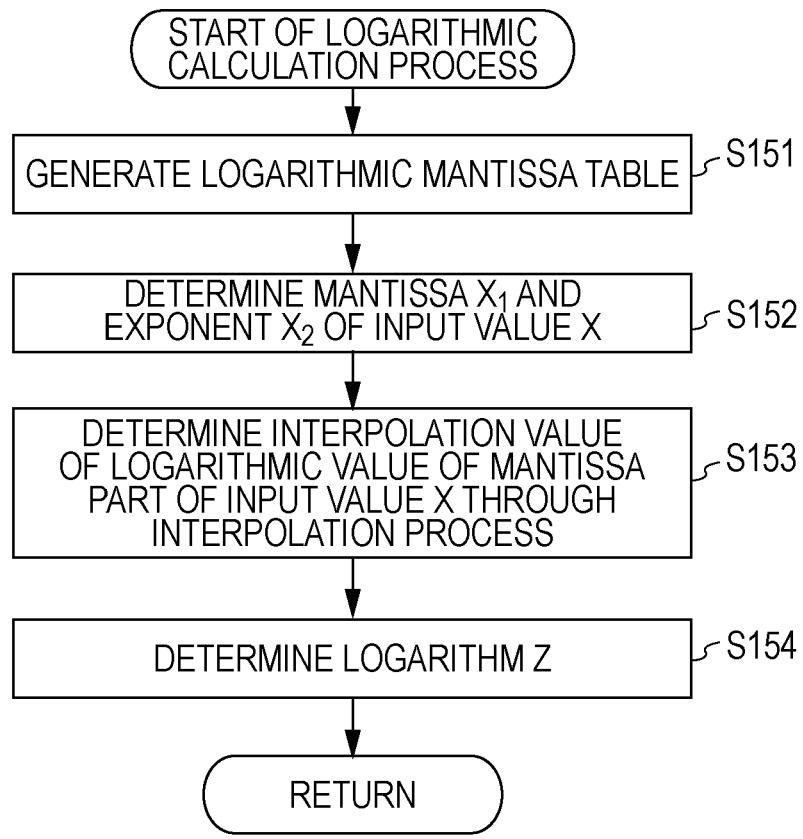
FIG. 19 illustrates a logarithmic calculation process of the logarithmic calculation processor.

The logarithmic calculation process corresponding to the operation performed in step S71 of FIG. 13 is described below with reference to the flowchart of FIG. 19.

Steps S151-S153 are respectively identical to steps S41, S43, and S44 illustrated in FIG. 6, and the discussion thereof is omitted here.

The logarithmic mantissa table storage unit 102 generates the logarithmic mantissa table represented by equation (21). The mantissa/exponent splitter 101 determines the mantissa $X_1$ and the exponent $X_2$ of the input value X. The mantissa $X_1$ is supplied to the interpolation processor 104 while the exponent $X_2$ is supplied to the logarithmic calculator 231.

The interpolation processor 104 determines the index index1 and the lower value $X_{h1}$ in accordance with equations (23) and (24). The index index1 is used to retrieve the table value from the logarithmic mantissa table. The interpolation processor 104 performs the interpolation process, such as the linear interpolation or the quadratic interpolation, based on the lower value $X_{h1}$ and the table value. The interpolation processor 104 determines the logarithmic value ($\log_2(1+X_1/2^{23})$) of the mantissa part of the input value X. The interpolation value thus determined is supplied from the interpolation processor 104 to the logarithmic calculator 231 as the final logarithmic value of the mantissa part of the input value X.

The table size of the logarithmic mantissa table to be generated is determined through the interpolation process performed by the interpolation processor 104. For example, if a quadratic interpolation is performed as the interpolation process, the table size is $2^N+2$=SIZE+2.

In step S154, the logarithmic calculator 231 calculates equation (6) based on the exponent $X_2$ from the mantissa/exponent splitter 101, the supplied power exponent Y, and the logarithmic value ($\log_2(1+X_1/2^{23})$) from the interpolation processor 104. The logarithmic calculator 231 thus determines the logarithmic value Z. When the logarithmic value Z determined by the logarithmic calculator 231 is supplied to the power calculation processor 142, the logarithmic calculation process is completed. Processing proceeds to step S72 illustrated in FIG. 13.

The logarithmic calculation processor 141 performs in this way the interpolation process using the table value retrieved from the logarithmic mantissa table, and determines the logarithmic value Z from the logarithmic value acquired through the interpolation process.

As in the logarithmic calculation processor 141, several arrangements of the power calculation processor 142 in the arithmetic processing apparatus 131 illustrated in FIG. 12 are contemplated.

For example, the power calculation processor 142 determines the arithmetic value P by calculating equation (7). The range of the fraction $Z_{amari}$ of the power value $2^{Z_{amari}}$ in equation (7) is $0 \leq Z_{amari} < 1.0$. A process amount for the calculation of the power value $2^{Z_{amari}}$ is not so large.

If the power calculation processor 142 is constructed of an arithmetic device that performs a power calculation of 2, the power calculation processor 142 can calculate the arithmetic value P at a high speed. The use of a dedicated arithmetic device calculating the power value $2^{Z_{amari}}$ allows the power calculation processor 142 to be simpler in structure than when a general-purpose arithmetic device is used.

Figure 20:
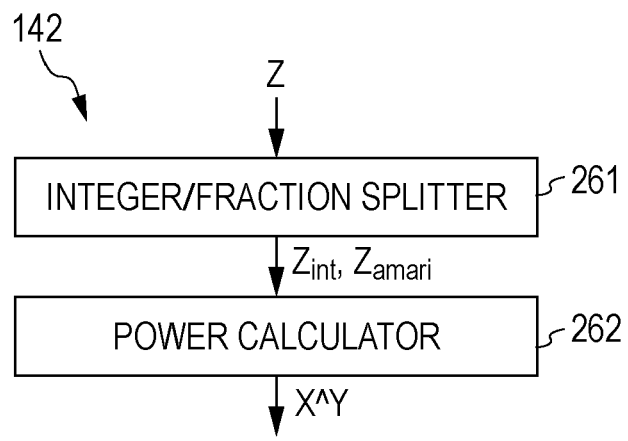
FIG. 20 is a flowchart illustrating a power calculation processor.

In such a case, the power calculation processor 142 may have a structure illustrated in FIG. 20.

The power calculation processor 142 illustrated in FIG. 20 includes an integer/fraction splitter 261, and a power calculator 262. In the power calculation processor 142, the integer/fraction splitter 261 receives the logarithmic value Z from the logarithmic calculation processor 141.

The integer/fraction splitter 261 determines the integer $Z_{int}$ and the fraction $Z_{amari}$ of the logarithmic value Z supplied from the logarithmic calculation processor 141, and then supplies the resulting integer $Z_{int}$ and fraction $Z_{amari}$ to the power calculator 262. Using the integer $Z_{int}$ and the fraction $Z_{amari}$ from the integer/fraction splitter 261, the power calculator 262 calculates the arithmetic value P and then supplies the resulting arithmetic value P to the integer converter 108 illustrated in FIG. 12.

Figure 21:
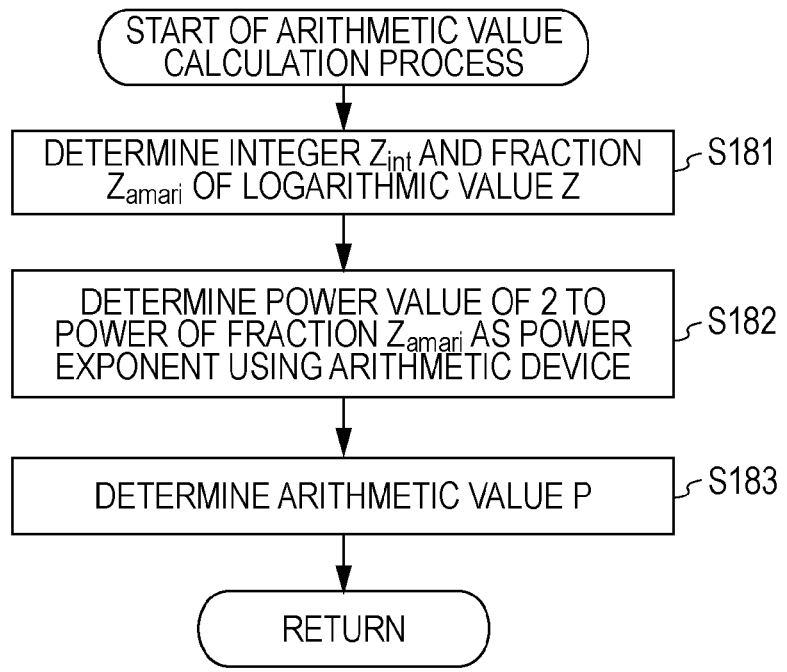
FIG. 21 is a flowchart illustrating a power calculation process of the power calculation processor.

An arithmetic value calculation process corresponding to the operation performed in step S72 of FIG. 13 is described below with reference to a flowchart of FIG. 21.

In step S181, the integer/fraction splitter 261 calculates the following equations (54) and (55) based on the logarithmic value Z supplied from the logarithmic calculation processor 141, thereby determining the integer $Z_{int}$ and the fraction $Z_{amari}$:

$$Z_{int}=(\text{int})Z \tag{54}$$

$$Z_{amari}=Z-(\text{int})Z \tag{55}$$

More specifically, the integer/fraction splitter 261 extracts the integer part of the logarithmic value Z as the integer $Z_{int}$ and sets to be the fraction $Z_{amari}$ a value that is obtained by subtracting the integer part of the logarithmic value Z from the logarithmic value Z. The integer $Z_{int}$ and fraction $Z_{amari}$ thus determined are supplied from the integer/fraction splitter 261 to the power calculator 262.

In step S182, the power calculator 262 uses the internal arithmetic device, thereby calculating the power value ($2^{Z_{amari}}$) with the fraction $Z_{amari}$ as a power exponent based on the fraction $Z_{amari}$ supplied from the integer/fraction splitter 261.

In step S183, the power calculator 262 calculates the arithmetic value P from the integer $Z_{int}$ from the integer/fraction splitter 261 and the calculated power value ($2^{Z_{amari}}$). The calculated arithmetic value P is supplied to the integer converter 108.

By substituting the integer $Z_{int}$ from the integer/fraction splitter 261 in equation (50), the power calculator 262 calculates the power value ($2^{Z_{int}}$) having the integer $Z_{int}$ as a power exponent. The power calculator 262 then substitutes the resulting power value ($2^{Z_{int}}$) and power value ($2^{Z_{amari}}$) in equation (51) to determine the arithmetic value P. The arithmetic value P here is floating-point type data. The arithmetic value P thus determined is supplied to the integer converter 108. The arithmetic value calculation process is completed. Processing proceeds to step S73 in FIG. 13.

The power calculation processor 142 determines the arithmetic value P using the internal arithmetic device. With the power of fraction table becoming unnecessary, the power calculation processor 142 is miniaturized.

Figure 22:
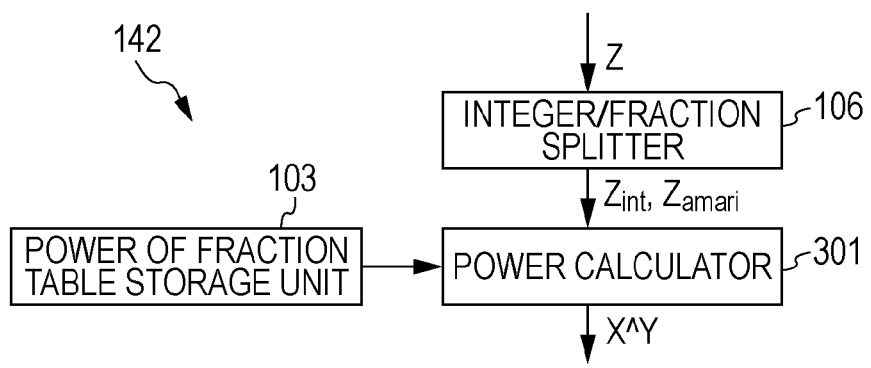
FIG. 22 illustrates a power calculation processor.

With reference to FIG. 20, the power calculation processor 142 employs the arithmetic device in the arithmetic calculation. Optionally, the power of fraction table may be used to determine the arithmetic value P. In such a case, the power calculation processor 142 is constructed as illustrated in FIG. 22. In FIG. 22, elements identical to those illustrated in FIG. 5 are designated with the same reference numerals and the discussion thereof is omitted as appropriate.

The power calculation processor 142 illustrated in FIG. 22 includes the integer/fraction splitter 106, power of fraction table storage unit 103, and power calculator 301. In the power calculation processor 142, the integer/fraction splitter 106 receives the logarithmic value Z from the logarithmic calculation processor 141.

The integer/fraction splitter 106 acquires the integer $Z_{int}$ and the fraction $Z_{amari}$ of the logarithmic value Z supplied from the logarithmic calculation processor 141 and then supplies the integer $Z_{int}$ and the fraction $Z_{amari}$ to the power calculator 301. The power calculator 301 calculates the arithmetic value P using the integer $Z_{int}$ and the fraction $Z_{amari}$ from the integer/fraction splitter 106 while referencing the power of fraction table of the power of fraction table storage unit 103. The calculated arithmetic value P is supplied to the integer converter 108 illustrated in FIG. 12.

Figure 23:
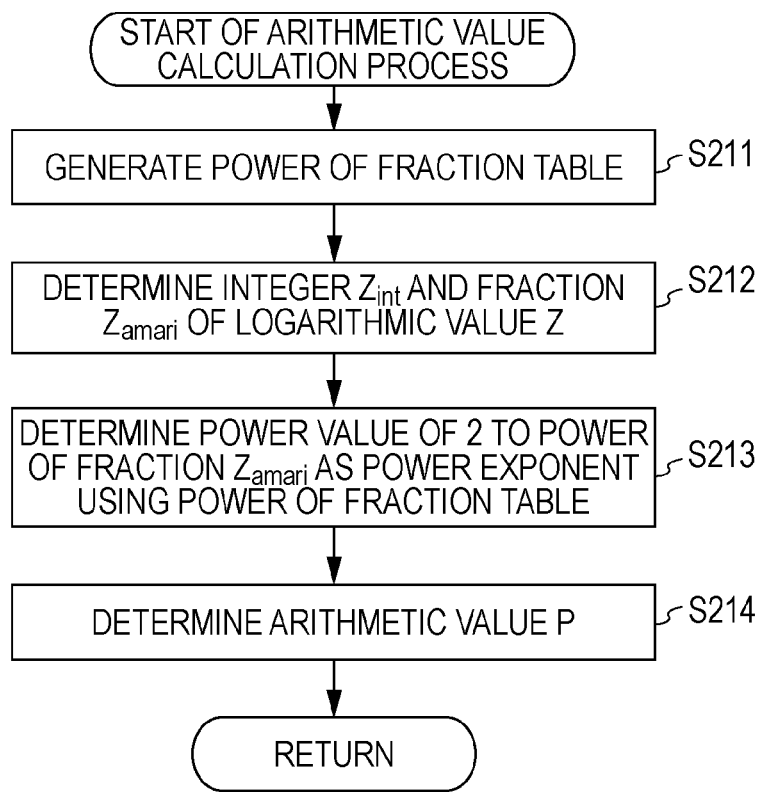
FIG. 23 is a flowchart illustrating a power calculation process of the power calculation processor.

An arithmetic value calculation process corresponding to the operation performed in step S72 of FIG. 13 is described with reference to a flowchart of FIG. 23.

Steps S211 and S212 are respectively identical to steps S42 and S46 illustrated in FIG. 6 and the discussion thereof is omitted.

However, in step S211, the power of fraction table storage unit 103 generates the power of fraction table composed of the table value twotable[i] represented by equation (22) with the table size of the power of fraction table being $2^N$=SIZE. Here the variable i is i=0, (SIZE-1). The power of fraction table is generated and the integer $Z_{int}$ and the fraction $Z_{amari}$ are calculated in accordance with equations (35) and (36). Processing proceeds to from step S212 to step S213.

In step S213, the power calculator 301 calculates the power value ($2^{Z_{amari}}$) with the fraction $Z_{amari}$ being a power exponent using the power of fraction table of the power of fraction table storage unit 103 in accordance with the fraction $Z_{amari}$ from the integer/fraction splitter 106.

More specifically, the power calculator 301 calculates equations (37) and (38) using the fraction $Z_{amari}$, thus determining as the index index2 the value of the upper N bits of the fraction $Z_{amari}$ from the 22nd bit. The power calculator 301 further calculates the power value ($2^{Z_{amari}}$) in accordance with equation (56) in response to the index index2:

$$2^{Z_{amari}}\text{twotable[index2]} \tag{56}$$

More specifically, the power calculator 301 sets as the index index2 the value of the upper N bits extracted from the fraction $Z_{amari}$, and retrieves from the power of fraction table of the power of fraction table storage unit 103 the table value twotable[index2] with the variable i being the index index2. The retrieved table value twotable[index2] is the power value ($2^{Z_{amari}}$).

In step S214, the power calculator 301 determines the arithmetic value P from the integer $Z_{int}$ from the integer/fraction splitter 106, and the determined power value ($2^{Z_{amari}}$).

By calculating equation (50) in response to the integer $Z_{int}$ from the integer/fraction splitter 106, the power calculator 301 calculates the power value ($2^{Z_{int}}$). The power calculator 301 further calculates the arithmetic value P by substituting the resulting power value ($2^{Z_{amari}}$) and power value ($2^{Z_{int}}$) in equation (51). The calculated arithmetic value P is supplied to the integer converter 108. When the arithmetic value P is determined, the arithmetic value calculation process is completed. Processing proceeds to step S73 in FIG. 13.

The power calculation processor 142 determines the arithmetic value P using the power of fraction table in this way.

Figure 24:
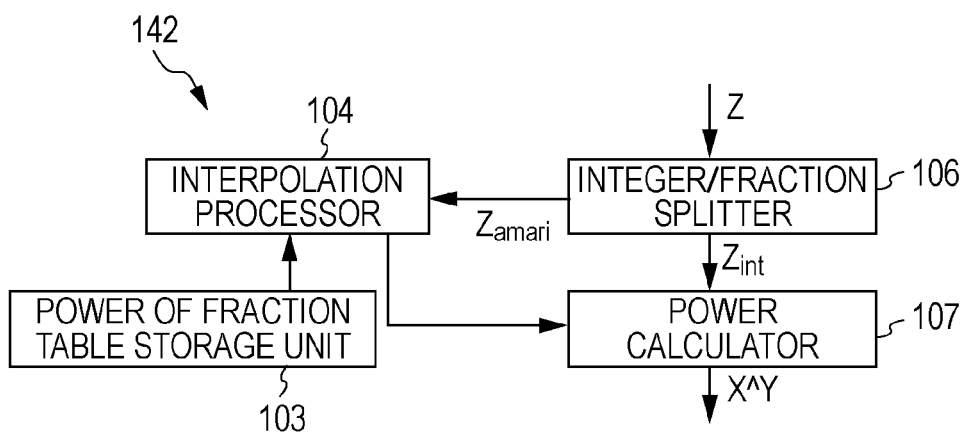
FIG. 24 illustrates a power calculation processor.

In order to reduce the table size of the power of fraction table, the interpolation process may be performed on the table value retrieved from the power of fraction table. In such a case, the power calculation processor 142 is constructed as illustrated in FIG. 24. In FIG. 24, elements identical to those illustrated in FIG. 5 are designated with the same reference numerals and the discussion thereof is omitted as appropriate.

The power calculation processor 142 illustrated in FIG. 24 includes power of fraction table storage unit 103, interpolation processor 104, integer/fraction splitter 106 and power calculator 107. In the power calculation processor 142, the integer/fraction splitter 106 receives the logarithmic value Z from the logarithmic calculation processor 141.

The integer/fraction splitter 106 determines the integer $Z_{int}$ and the fraction $Z_{amari}$ of the logarithmic value Z supplied from the logarithmic calculation processor 141, and supplies the fraction $Z_{amari}$ to the interpolation processor 104 and the integer $Z_{int}$ to the power calculator 107. The power calculator 107 calculates the arithmetic value P from the integer $Z_{int}$ from the integer/fraction splitter 106 and the power value ($2^{\wedge}Z_{amari}$) from the interpolation processor 104. The calculated arithmetic value P is then supplied to the integer converter 108 illustrated in FIG. 12.

Figure 25:
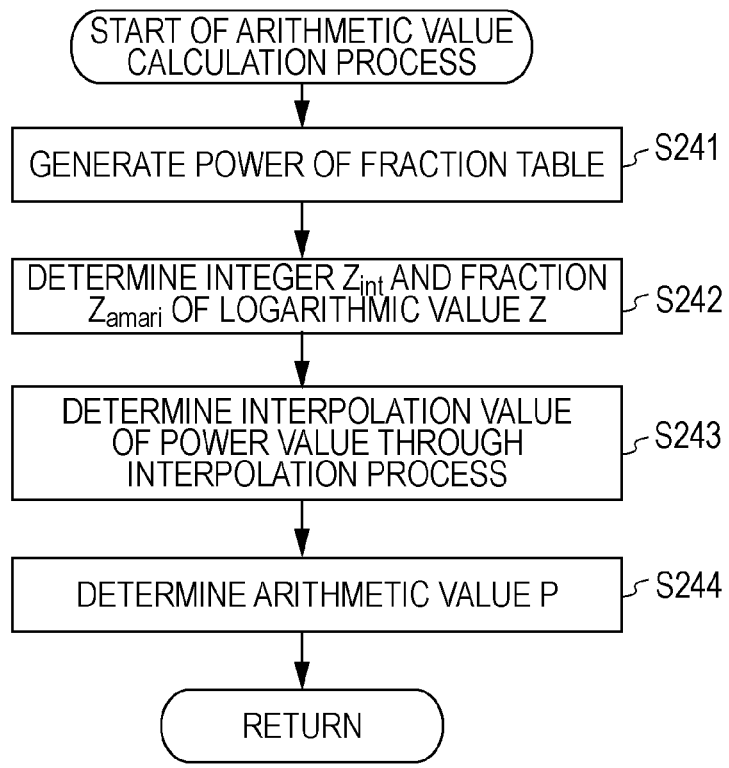
FIG. 25 is a flowchart illustrating a power calculation process of the power calculation processor.

The arithmetic value calculation process corresponding to the operation performed in step S72 illustrated in FIG. 13 is described below with reference to a flowchart illustrated in FIG. 25.

Steps S241 through S243 are respectively identical to steps S42, S46 and S47 illustrated in FIG. 6, and the discussion thereof is omitted here.

The power of fraction table storage unit 103 generates the power of fraction table represented by equation (22). The integer/fraction splitter 106 calculates equations (35) and (36) from the logarithmic value Z from the logarithmic calculation processor 141. The integer/fraction splitter 106 thus determines the integer $Z_{int}$ and the fraction $Z_{amari}$. The integer $Z_{int}$ is supplied from the integer/fraction splitter 106 to the power calculator 107. The fraction $Z_{amari}$ is supplied from the integer/fraction splitter 106 to the interpolation processor 104.

The interpolation processor 104 calculates equations (37) through (39) in response to the fraction $Z_{amari}$, thereby determining the index index2 and the lower value $X_{h2}$. The interpolation processor 104 retrieves the table value from the power of fraction table in response to the index index2. The interpolation processor 104 then performs the interpolation process, such as a linear interpolation or a quadratic interpolation, on the lower value $X_{h2}$ and the table value, thereby determining the interpolation value ($2^{\wedge}Z_{amari}$) as a power of 2 with the fraction $Z_{amari}$ as a power exponent. The calculated interpolation value ($2^{\wedge}Z_{amari}$) is supplied from the interpolation processor 104 to the power calculator 107 as the final power value ($2^{\wedge}Z_{amari}$).

In step S244, the power calculator 107 calculates the arithmetic value P from the integer $Z_{int}$ from the integer/fraction splitter 106, and the power value ($2^{\wedge}Z_{amari}$) from the interpolation processor 104.

More specifically, the power calculator 107 calculates equation (50) in response to the integer $Z_{int}$ from the integer/fraction splitter 106, thereby determining the power value ($2^{\wedge}Z_{int}$). The power calculator 107 further substitutes the power value ($2^{\wedge}Z_{amari}$) and the power value ($2^{\wedge}Z_{int}$) from the interpolation processor 104 in equation (51), thereby determining the arithmetic value P. The arithmetic value P is then supplied to the integer converter 108. When the arithmetic value P is determined, the arithmetic value calculation process ends. Processing proceeds to step S73 as illustrated in FIG. 13.

The power calculation processor 142 performs the interpolation process using the table value retrieved from the power of fraction table, and determines the arithmetic value P in response to the power value obtained through the interpolation process.

Third Embodiment

In the above discussion, the arithmetic value P is integerized after the constant α is added to the arithmetic value P. As represented in equation (1), the value of the power exponent Y is determined in many standards related to quantization of the audio signal. The integer part of the arithmetic value is obtained through a simple operation by adding $\alpha^{1/Y}$ to the input value X rather than adding the constant α to the arithmetic value P.

More specifically, let X' represent the input value X discussed heretofore, and the sum of $\alpha^{1/Y}$ and X' is used in the power calculation process as a new input value $X=X'+\alpha^{1/Y}$. For example, in the case of the quantization of the audio signal represented by equation (1), the input value X is $X=X'+\alpha^{4/3}$.

Figure 26:
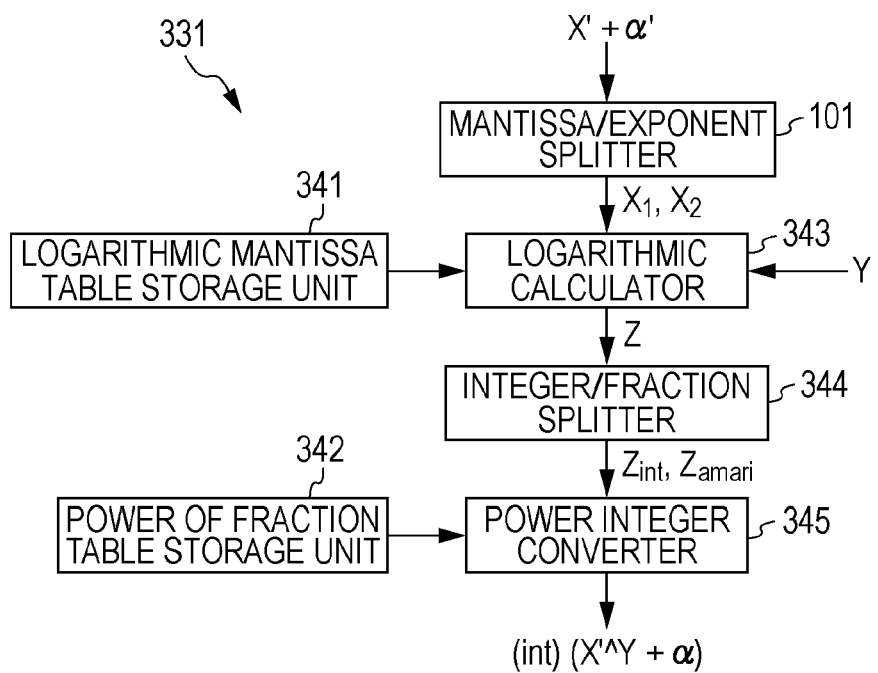
FIG. 26 illustrates an arithmetic processing apparatus.

If the input value X is the sum of the variable X' and the constant α to the power of 1/Y, the arithmetic processing apparatus 331 is constructed as illustrated in FIG. 26. In FIG. 26, elements identical to those illustrated in FIG. 5 are designated with the same reference numerals and the discussion thereof is omitted as appropriate.

The arithmetic processing apparatus 331 includes mantissa/exponent splitter 101, logarithmic mantissa table storage unit 341, power of fraction table storage unit 342, logarithmic calculator 343, integer/fraction splitter 344, and power integer converter 345.

In the arithmetic processing apparatus 331, the mantissa/exponent splitter 101 receives the input value $X=X'+\alpha^{1/Y}$, and the logarithmic calculator 343 receives the power exponent Y. More specifically, in the arithmetic processing apparatus 331, the mantissa/exponent splitter 101 receives the input value X, which is the sum of the input value X' and the constant $\alpha^{1/Y}$.

The logarithmic mantissa table storage unit 341 and the power of fraction table storage unit 342 store the logarithmic mantissa table and the power of fraction table, respectively, and supply table values identified by the index index1 and the index index2 to the logarithmic calculator 343 and the power integer converter 345, respectively.

The logarithmic calculator 343 calculates the logarithmic value Z in accordance with equation (6) in response to the mantissa $X_1$ and the exponent $X_2$ of the input value X supplied from the mantissa/exponent splitter 101. The calculated logarithmic value Z is then supplied to the integer/fraction splitter 344. In this case, from the logarithmic mantissa table storage unit 341, the logarithmic calculator 343 retrieves as the logarithmic value ($\log_2(1+X_1/2^{23})$) of the mantissa part of the input value X the table value identified by the index index1 from the mantissa $X_1$.

The integer/fraction splitter 344 splits the logarithmic value Z from the logarithmic calculator 343 into the integer $Z_{int}$ and the fraction $Z_{amari}$, and supplies the integer $Z_{int}$ and the fraction $Z_{amari}$ to the power integer converter 345. The power integer converter 345 references the power of fraction table of the power of fraction table storage unit 342, determines the integer part of the arithmetic value (P+α) in response to the integer $Z_{int}$ and the fraction $Z_{amari}$ from the integer/fraction splitter 344, and outputs the integer part of the arithmetic value (P+α). The arithmetic value (P+α) is the sum of the arithmetic value $P=X'^{Y}$ and the constant α, i.e., the arithmetic value $(P+\alpha)=X^{Y}$, and serves as a target of integerization.

Figure 27:
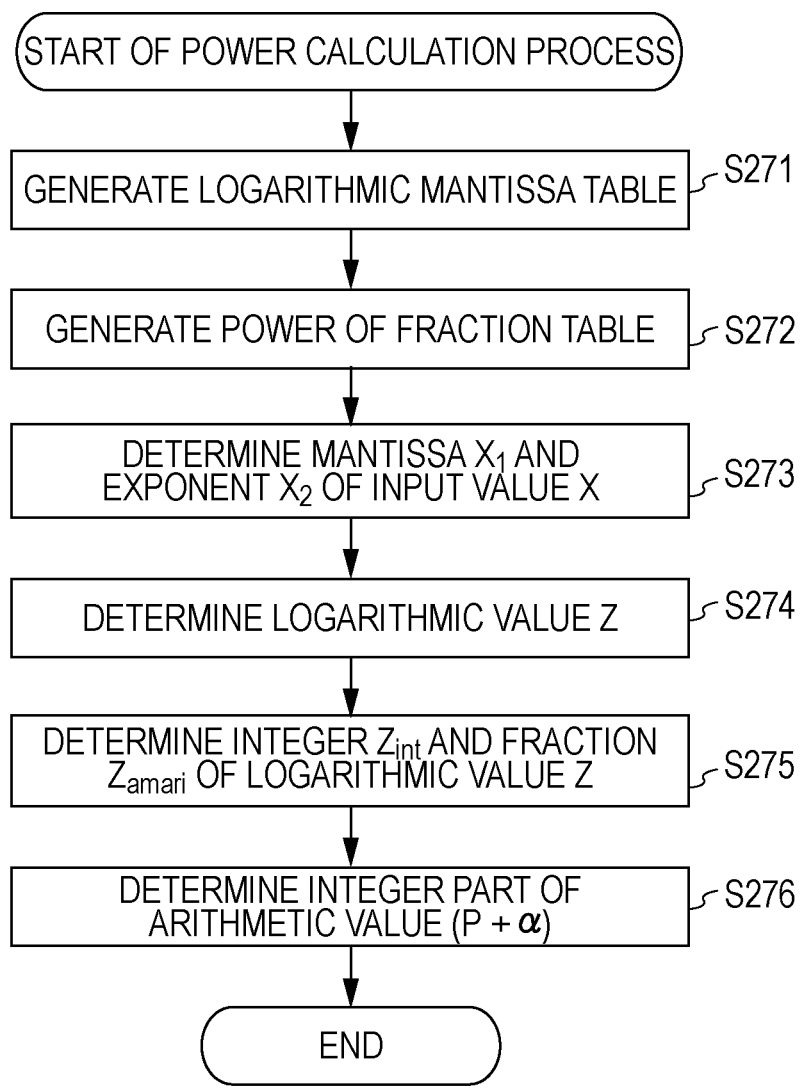
FIG. 27 is a flowchart illustrating a power calculation process of the arithmetic processing apparatus.

A power calculation process of the arithmetic processing apparatus 331 is described below with reference to a flowchart illustrated in FIG. 27.

In step S271, the logarithmic mantissa table storage unit 341 generates the logarithmic mantissa table. More specifically, the logarithmic mantissa table storage unit 341 generates the logarithmic mantissa table composed of the table value logtable[i]. The table value logtable[i] as a logarithmic value of the mantissa part of the input value X has 2 as a base with respect to the value of the mantissa $X_1$ as represented in the following equation (57)

$$\text{logtable}[i]=\log_2(1+i/\text{SIZE}), i=0, \ldots, \text{SIZE}-1 \quad (57)$$

where the variable i of the table value logtable[i] indicates the value of the index index1 determined from the mantissa $X_1$, and is i=0, ..., (SIZE−1). The logarithmic mantissa table storage unit 341 determines the table value logtable[i] responsive to each of the variables i of SIZE units, and generates and stores the logarithmic mantissa table that maps the value i to the table value logtable[i].

In step S272, the power of fraction table storage unit 342 generates the power of fraction table. The power of fraction table storage unit 342 generates the power of fraction table composed of the table value twotable[i] represented by equation (58) with the table size of the power of fraction table being $2^N$=SIZE:

$$\text{twotable}[i]=(\text{int})(2^{(i/\text{SIZE})} \times 2^{23}), i=0, \ldots, \text{SIZE}-1 \quad (58)$$

where the variable i of the table value twotable[i] indicates the value of the index index2 determined from the fraction $Z_{amari}$ and used to identify the table value twotable[i], and the variable i is i=0, ..., (SIZE−1).

If the index index2 is the value of several upper bits of the fraction $Z_{amari}$, $2^{(i/\text{SIZE})}$ in equation (58) is an approximate value of the power value $2\hat{}Z_{amari}$, which is 2 to the power of the fraction $Z_{amari}$ as a power exponent. In equation (58), the approximate value $2^{(i/\text{SIZE})}$ is multiplied by $2^{23}$ for integerization. The approximate value $2^{(i/\text{SIZE})}$ is thus a fixed-point number having the decimal point at the 23rd bit (fixed-point type binary data).

The power of fraction table storage unit 342 determines the table value twotable[i] responsive to each of the variables i of SIZE units, and generates and stores the power of fraction table that maps each variable i to the respective table value twotable[i].

It is sufficient if the process of generating the logarithmic mantissa table and the power of fraction table is performed once prior to the power calculation of the input value X. Once the logarithmic mantissa table and the power of fraction table are generated, the generated logarithmic mantissa table and power of fraction table may be used when the power calculation of the input value X is performed.

In step S273, the mantissa/exponent splitter 101 determines the mantissa $X_1$ and the exponent $X_2$ of the supplied input value X, and supplies the determined mantissa $X_1$ and exponent $X_2$ to the logarithmic calculator 343.

In step S274, the logarithmic calculator 343 determines the logarithmic value Z of the arithmetic value (P+α) having 2 as a base in accordance with equation (6) in response to the mantissa $X_1$ and the exponent $X_2$ from the mantissa/exponent splitter 101. The arithmetic value (P+α) is then supplied to the integer/fraction splitter 344. In this case, the arithmetic value P in equation (6) is the arithmetic value (P+α).

The logarithmic calculator 343 calculates equation (23) using the mantissa $X_1$, determines as the index index1 the value of the upper N bits of the mantissa $X_1$ from the 22nd bit, and thus calculates the logarithmic value of the mantissa part of the input value X in accordance with equation (53) in response to the index index1.

More specifically, the logarithmic calculator 343 sets as the index index1 the value of the upper N bits extracted from the mantissa $X_1$, and retrieves from the logarithmic mantissa table of the logarithmic mantissa table storage unit 341 the table value logtable[index1] with the variable i being the index index1. The retrieved table value logtable[index1] serves as the logarithmic value ($\log_2(1+X_1/2^{23})$) of the mantissa part of the input value X.

The logarithmic calculator 343 further calculates the logarithmic value $Z=Y(X_2+\log_2(1+X_1/2^{23}))$ from the supplied power exponent Y, the exponent $X_2$ from the mantissa/exponent splitter 101, and the retrieved logarithmic value ($\log_2(1+X_1/2^{23})$).

In step S275, the integer/fraction splitter 344 determines the integer $Z_{int}$ and the fraction $Z_{amari}$ of the logarithmic value Z supplied from the logarithmic calculator 343 and then supplies the integer $Z_{int}$ and fraction $Z_{amari}$ to the power integer converter 345.

More specifically, the integer/fraction splitter 344 determines the integer $Z_{int}$ of the logarithmic value Z by calculating equation (59) using the logarithmic value Z:

$$Z_{int} = \begin{cases} (\text{int})Z & Z \geq 0 \\ -2 & Z < 0 \end{cases} \quad (59)$$

If the logarithmic value Z is equal to or greater than zero, the integer part of the logarithmic value Z is extracted and handled as the integer $Z_{int}$. If the logarithmic value Z is smaller than zero, a negative value of "−2" serves as the integer $Z_{int}$.

The integer/fraction splitter 344 determines the fraction $Z_{amari}$ in accordance with equation (60) in response to the logarithmic value Z:

$$Z_{amari}=(\text{int})((Z-(\text{int})Z)\times 2^{23}) \quad (60)$$

where the fraction $Z_{amari}$ is an integer part of a value resulting from multiplying $2^{23}$ by a value that results from subtracting the integer part of the logarithmic value Z from the logarithmic value Z (i.e., a difference between the logarithmic value Z and the integer part of the logarithmic value Z). More specifically, the value of the integer part of the logarithmic value Z is determined by calculating the difference between the logarithmic value Z and the integer part of the logarithmic value Z. The difference is then multiplied by $2^{23}$, and the integer part of the resulting product is extracted. The integer part of the logarithmic value Z is thus converted into a fixed-point number with the decimal point at the 23rd bit (fixed-point type binary data).

In step S276, the power integer converter 345 determines the integer part of the arithmetic value (P+α) based on the integer $Z_{int}$ and the fraction $Z_{amari}$ from the integer/fraction splitter 344.

More specifically, the power integer converter 345 calculates equations (37) and (38) using the fraction $Z_{amari}$, thereby determining as the index index2 the value of upper N bits of the fraction $Z_{amari}$ above the 22nd bit. Moreover, the power integer converter 345 determines the power value ($2\hat{}Z_{amari}$) in accordance with equation (56) in response to the index index2.

More specifically, the power integer converter 345 sets the value of the upper N bits extracted from the fraction $Z_{amari}$ to be the index index2, and retrieves from the logarithmic mantissa table of the power of fraction table storage unit 342 the table value twotable[index2] with the variable i being the index index2. The retrieved table value twotable[index2] serves as the power value ($2^{\hat{}}Z_{amari}$).

The power integer converter 345 calculates the following equation (61) based on the calculated power value ($2^{\hat{}}Z_{amari}$), and the integer $Z_{int}$ from the integer/fraction splitter 344, thereby determining the integer part of the arithmetic value (P+α):

$$(\text{int})(P+\alpha) - 2^{Z_{amari}} >> (23 - Z_{int}) \tag{61}$$

where symbol ">>" denotes a right-shift operation. The power integer converter 345 right-shifts the power value ($2^{\hat{}}Z_{amari}$) by ($23-Z_{int}$) bits, thereby determining a value (int) (P+α) of the integer part of the arithmetic value (P+α).

The right-shift operation by ($23-Z_{int}$) bits is performed because of the following reasons. The power value ($2^{\hat{}}Z_{amari}$) determined through table lookup is fixed-point type data with the decimal point at the 23rd bit. The decimal point of the power value ($2^{\hat{}}Z_{amari}$) is shifted to the lower bit side by $Z_{int}$ (left-shift operation) in order to express the arithmetic value (P+α) in standard fraction representation without using base.

The right-shifting of the power value ($2^{\hat{}}Z_{amari}$) by ($23-Z_{int}$) results in the value of the integer part of the arithmetic value (P+α).

If the logarithmic value Z is negative, the arithmetic value (P+α) is 0≤P+α<1, and the integer part of the arithmetic value (P+α) becomes zero.

The right-shift operation is performed to extract the integer part of the arithmetic value (P+α). Taking into consideration that the maximum value of the power value ($2^{\hat{}}Z_{amari}$) is 2, the integer $Z_{int}$ is greater than −2. In the calculation of equation (59) for the integer $Z_{int}$, the integer $Z_{int}=-2$ if the logarithmic value Z is smaller than zero (negative).

When the integer part of the arithmetic value (P+α) is determined in this way, the power integer converter 345 outputs the integer part of the arithmetic value (P+α), namely, an integerized arithmetic value (P+α), and the power calculation process ends.

The arithmetic processing apparatus 331 thus determines the integer part of the arithmetic value (P+α) with the sum of the value X' and $\alpha^{1/Y}$ being the new input value X.

The value of the integer part of the arithmetic value (P+α) is determined more simply and easily by determining the integer part of the arithmetic value (P+α) with the sum of the value X' and $\alpha^{1/Y}$ being the new input value X. The described process makes it unnecessary for the integer part of the arithmetic value (P+α) to be determined subsequent to the determination of the arithmetic value P. The integer part of the arithmetic value (P+α) is directly determined from the power value ($2^{\hat{}}Z_{amari}$) and the integer $Z_{int}$. In this way, a process block corresponding to the integer converter 108 illustrated in FIG. 5 becomes unnecessary, and the arithmetic processing apparatus 331 is miniaturized.

In the above discussion, the logarithmic mantissa table and the power of fraction table has the same table size. The table size may be different depending on the accuracy level for the power calculation. The integer part of the arithmetic value (P+α) may be determined from a logarithmic value (Z) having base M and a power of M with the input value X represented in a base-M number.

Fourth Embodiment

The arithmetic processing apparatus 331 of the third embodiment does not perform the interpolation process on the logarithmic mantissa table and the power of fraction table. The table size has to be increased in order to increase the accuracy of the power calculation, i.e., the accuracy of the calculation of the integer part of the arithmetic value.

More specifically, the arithmetic processing apparatus 331 calculates the following equation (62) composed of L data sets. Each data set includes an integer part R of the arithmetic value (P+α) calculated using the logarithmic mantissa table and the power of fraction table and an integer part Q of the arithmetic value (P+α) obtained through the calculation of a mathematical library. By calculating equation (62), the arithmetic processing apparatus 331 determines the absolute error mean value U to evaluate the calculation accuracy of the integer part R:

$$U = \frac{1}{L}\sum_{i=1}^{L}|R_i - Q_i| \tag{62}$$

where $R_i$ represents an i-th sample of L integer samples of the integer part R calculated by the arithmetic processing apparatus 331, and $Q_i$ represents the value of the integer part determined through the mathematical library corresponding to $R_i$.

The inventors of this invention evaluated the calculation accuracy of the integer part R with L=8192. With N of the table size being 8, i.e., SIZE=256, the absolute error mean value was U=1.78×10$^{-1}$, which means that the resulting accuracy level is not so high. With N of the table size being 16, i.e., SIZE=65536, the absolute error mean value was U=1.56×10$^{-2}$, which means that the resulting accuracy level is hither than that with N=8.

The evaluation of the absolute error mean value U shows that the table size of each of the logarithmic mantissa table and the power of fraction table have to be increased in order to increase the accuracy of the integer part of the arithmetic value (P+α) calculated by the arithmetic processing apparatus 331.

The interpolation process performed on the values of the logarithmic mantissa table and the power of fraction table with the input value X=X'+$\alpha^{1/Y}$ not only integerizes the arithmetic value in a simple manner but also increases the calculation accuracy of the integer value.

Figure 28:
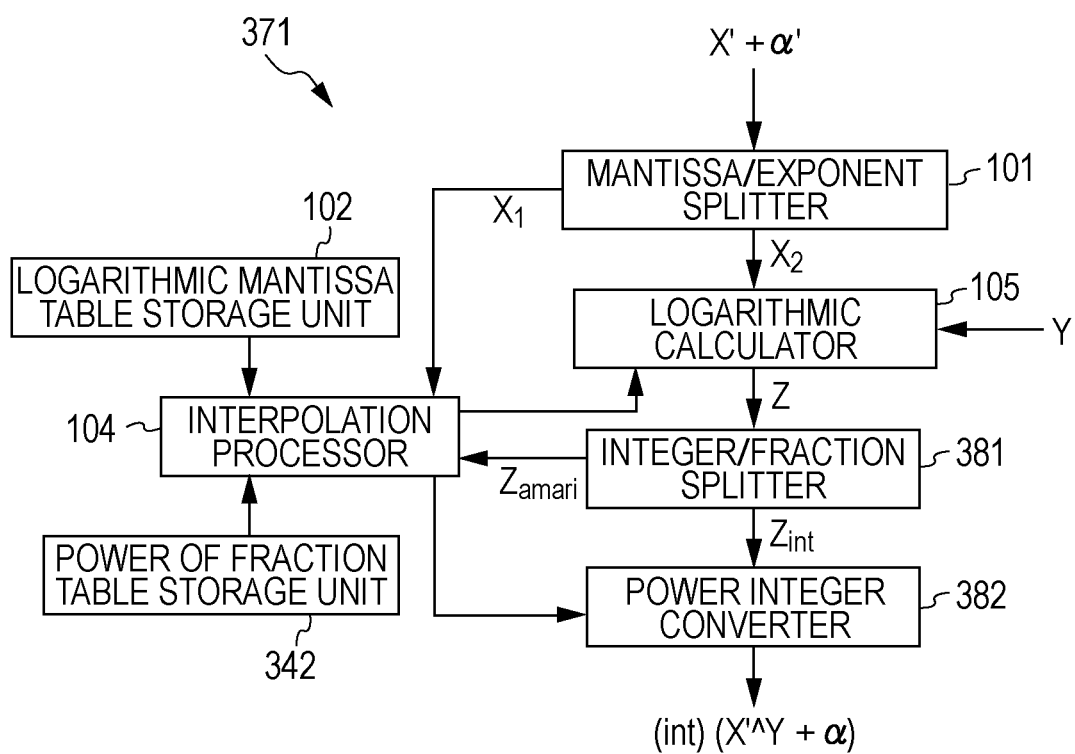
FIG. 28 illustrates an arithmetic processing apparatus.

An arithmetic processing apparatus 371 having such a structure is illustrated in FIG. 28. As illustrated in FIG. 28, elements identical to those illustrated in FIGS. 5 and 26 are designated with the same reference numerals, and the discussion thereof is omitted as appropriate.

The arithmetic processing apparatus 371 includes mantissa/exponent splitter 101, logarithmic mantissa table storage unit 102, interpolation processor 104, logarithmic calculator 105, power of fraction table storage unit 342, integer/fraction splitter 381, and power integer converter 382.

In the arithmetic processing apparatus 371, the mantissa/exponent splitter 101 receives the input value X=X'+$\alpha^{1/Y}$ and the logarithmic calculator 105 receives the power exponent Y.

The integer/fraction splitter 381 determines the integer $Z_{int}$ and the fraction $Z_{amari}$ of the logarithmic value Z supplied from the logarithmic calculator 105, and supplies the integer $Z_{int}$ to the power integer converter 382 and the fraction $Z_{amari}$ to the interpolation processor 104.

The power integer converter 382 determines and outputs the integer part of the arithmetic value (P+α) based on the power value 2 to the power of the fraction $Z_{amari}$ supplied from the interpolation processor 104 and the integer $Z_{int}$ supplied from the integer/fraction splitter 381. The arithmetic value (P+α) is the sum of the arithmetic value P=$X'^Y$ and the constant α, namely, the arithmetic value (P+α)=$X^Y$.

Figure 29:
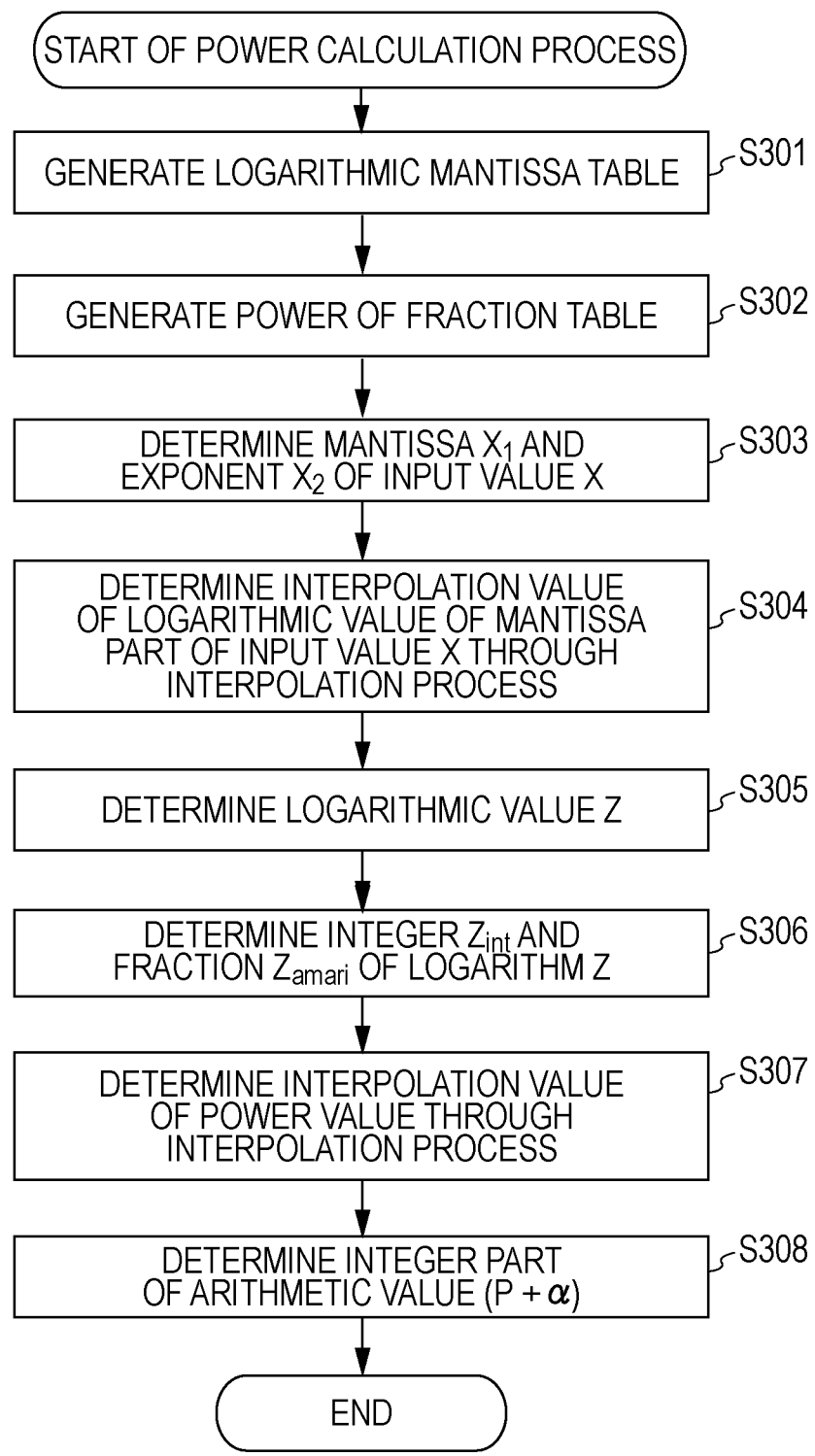
FIG. 29 is a flowchart illustrating a power calculation process of the arithmetic processing apparatus.

A power calculation process of the arithmetic processing apparatus 371 is described below with reference to a flowchart illustrated in FIG. 29.

Step S301 is identical to step S41 illustrated in FIG. 6, and the detailed discussion thereof is omitted here. The logarithmic mantissa table storage unit 102 generates the logarithmic mantissa table composed of the table value logtable[i] represented by equation (2).

In step S302, the power of fraction table storage unit 342 generates the power of fraction table. If the interpolation processor 104 performs a quadratic interpolation as the interpolation process, the power of fraction table storage unit 342 sets the table size of the power of fraction table to be $2^N+2$=SIZE+2. The power of fraction table storage unit 342 generates the power of fraction table composed of the table value twotable[i] represented by equation (58) wherein the variable i is i=0, ..., (SIZE+1).

The power of fraction table storage unit 342 determines the table value twotable[i] for each of the variables i of (SIZE+2) units, and generates and stores the power of fraction table that maps each variable i to the table value twotable[i].

If the interpolation processor 104 performs a linear interpolation as the interpolation process, the table size of the power of fraction table is $2^N+1$=(SIZE+1). The logarithmic mantissa table composed of the table value twotable[i] represented by equation (58) is generated.

Steps S303 and S304 are respectively identical to steps S43 and S44 illustrated in FIG. 6 and the detailed discussion thereof is omitted here.

The mantissa $X_1$ and the exponent $X_2$ of the input value X determined by the mantissa/exponent splitter 101 are respectively supplied to the interpolation processor 104 and the logarithmic calculator 105. The interpolation processor 104 determines the index index1 and the lower value $X_{h1}$ in accordance with equations (23) and (24) in response to the mantissa $X_1$. The index index1 is used to retrieve a table value from the logarithmic mantissa table of the logarithmic mantissa table storage unit 102.

The interpolation processor 104 performs the interpolation process, such as a linear interpolation or a quadratic interpolation, based on the lower value $X_{h1}$ and the table value. The interpolation value ($\log_2(1+X_1/2^{23})$) of the mantissa part of the input value X is thus determined. The interpolation value thus determined is supplied from the interpolation processor 104 to the logarithmic calculator 105 as the final logarithmic value of the mantissa part of the input value X.

In step S305, the logarithmic calculator 105 calculates equation (6) based on the exponent $X_2$ from the mantissa/exponent splitter 101, the supplied power exponent Y, and the logarithmic value from the interpolation processor 104. The logarithmic calculator 105 thus determines the logarithmic value Z of the arithmetic value (P+α) with 2 as a base, and then supplies the logarithmic value Z to the integer/fraction splitter 381. The arithmetic value P in equation (6) is the arithmetic value (P+α).

In step S306, the integer/fraction splitter 381 determines the integer $Z_{int}$ and the fraction $Z_{amari}$ in accordance with equations (59) and (60) in response to the logarithmic value Z from the logarithmic calculator 105. The integer/fraction splitter 381 supplies the calculated integer $Z_{int}$ to the power integer converter 382 and the fraction $Z_{amari}$ to the interpolation processor 104.

When the interpolation processor 104 is supplied with the fraction $Z_{amari}$, the interpolation process is performed in step S307 to determine an interpolation value, namely, a power value of 2 to the power of the fraction $Z_{amari}$ as a power exponent. Step S307 is identical to step S47 illustrated in FIG. 6, and the discussion thereof is omitted here.

The interpolation processor 104 calculates equations (37) through (39) in response to the fraction $Z_{amari}$, thereby determining the index index2 and the lower value $X_{h2}$. In response to the index index2, the interpolation processor 104 retrieves the table value from the power of fraction table of the power of fraction table storage unit 342. The interpolation processor 104 performs the interpolation process, such as a linear interpolation or a quadratic interpolation, using the lower value $X_{h2}$ and the table value, thereby determining the interpolation value ($2^{Z_{amari}}$), namely, a power value of 2 to the power of the fraction $Z_{amari}$ as a power exponent. The calculated interpolation value as the final power value ($2^{Z_{amari}}$) is supplied from the interpolation processor 104 to the power integer converter 382.

In step S308, the power integer converter 382 calculates equation (61) in response to the integer $Z_{int}$ from the integer/fraction splitter 381 and the power value ($2^{Z_{amari}}$) from the interpolation processor 104, thereby determining the integer part of the arithmetic value (P+α).

When the integer part of the arithmetic value (P+α) is determined, the power integer converter 382 outputs the integer part of the arithmetic value (P+α), namely, an integerized arithmetic value (P+α). The power calculation process thus ends.

The interpolation process performed on the value of the logarithmic mantissa table and the value of the power of fraction table increases easily the accuracy of the calculation of calculating the integer part of the arithmetic value (P+α) without increasing the table size of these tables.

Figures 30, 31:
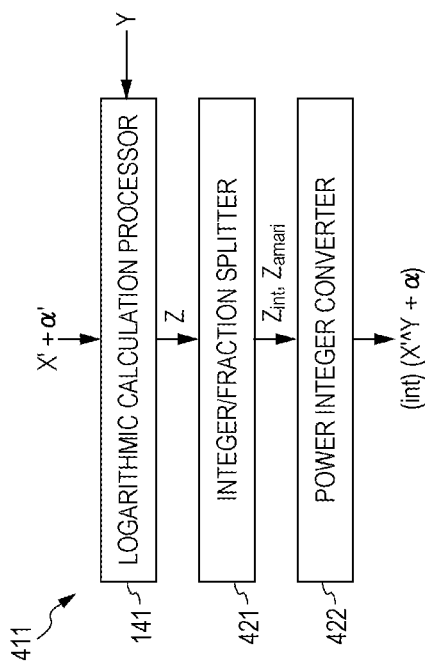
FIG. 30 illustrates an absolute error mean value.
FIG. 31 illustrates an arithmetic processing apparatus.

More specifically, the inventors of this invention evaluated the calculation accuracy of the integer part R of the arithmetic value (P+α) calculated by the arithmetic processing apparatus 371 in accordance with the absolute error mean value U resulting from calculating equation (62). FIG. 30 illustrates evaluation results.

FIG. 30 lists the absolute error mean values U of the interpolated and non-interpolated values of the logarithmic mantissa table and the power of fraction table with N in the table size of each of the logarithmic mantissa table and the power of fraction table being 8 (i.e., SIZE=256).

Label "power (no interpolation)" indicates that a value in the power of fraction table without being interpolated is used to calculate the integer part R. Label "power (linear interpolation)" indicates that a value in the power of fraction table is linearly interpolated and used to calculate the integer part R. Label "power (quadratic interpolation)" indicates that a value in the power of fraction table is quadratically interpolated and used to calculate the integer part R.

Similarly, "logarithm (no interpolation)" indicates that a value in the logarithmic mantissa table without being interpolated is used to calculate the integer part R. Label "logarithm (linear interpolation)" indicates that a value in the logarithmic mantissa table is linearly interpolated and used to calculate the integer part R. Label "logarithm (quadratic interpolation)" indicates that a value in the logarithmic mantissa table is quadratically interpolated and used to calculate the integer part R.

FIG. 30 illustrates that the interpolation process performed on at least one of the value in the logarithmic mantissa table and the value in the power of fraction table increases the accuracy of the calculation of power value (more in detail, an integer of the power value). For example, if the linear interpolation is performed on both the value in the logarithmic mantissa table and the value in the power of fraction table, the absolute error mean value U is $U=8.06 \times 10^{-3}$. If the quadratic interpolation is performed on both the value in the logarithmic mantissa table and the value in the power of fraction table, the absolute error mean value U is $U=2.44 \times 10^{-3}$.

The absolute error mean value U with one of the linear interpolation and the quadratic interpolation performed on both the table values is smaller than the absolute error mean value of the quantizing apparatus 51 in the related art with N=16 (i.e., the table size=65536). The calculation accuracy is thus increased. More specifically, even with a small table size, a high calculation accuracy results.

The arithmetic processing apparatus 371 performs the interpolation process on both the value in the logarithmic mantissa table and the value in the power of fraction table. The interpolation process may be performed one of the value in the logarithmic mantissa table and the value in the power of fraction table depending on a process amount of the interpolation process and a calculation accuracy. Different interpolation processes may be performed on the values of different tables.

Fifth Embodiment

FIG. 31 is a block diagram of an arithmetic processing apparatus 411 in accordance with a fifth embodiment of the present invention. In FIG. 31, elements identical to those illustrated in FIG. 12 are designated with the same reference numerals and the discussion thereof is omitted as appropriate.

The arithmetic processing apparatus 411 includes logarithmic calculation processor 141, integer/fraction splitter 421, and power integer converter 422. In the arithmetic processing apparatus 411, the logarithmic calculation processor 141 receives the input value $X=X'+\alpha^{1/Y}$ and the power exponent Y.

The logarithmic calculation processor 141, identical to the logarithmic calculation processor 141 illustrated in FIG. 12, may be constructed as illustrated in one of FIGS. 14, 16, and 18. The logarithmic calculation processor 141 supplies the logarithmic value Z determined from the input value X to the integer/fraction splitter 421.

The integer/fraction splitter 421 determines the integer $Z_{int}$ and the fraction $Z_{amari}$ of the logarithmic value Z from the logarithmic calculation processor 141 and then supplies the integer $Z_{int}$ and the fraction $Z_{amari}$ to the power integer converter 422. The power integer converter 422 performs a shift operation using the integer $Z_{int}$ and the fraction $Z_{amari}$ from the integer/fraction splitter 421, thereby determining and outputting the integer part of the arithmetic value (P+α). The arithmetic value (P+α) here is the sum of the arithmetic value $P=X'^Y$ and the constant α, i.e., the arithmetic value $(P+\alpha)=X^Y$.

Figure 32:
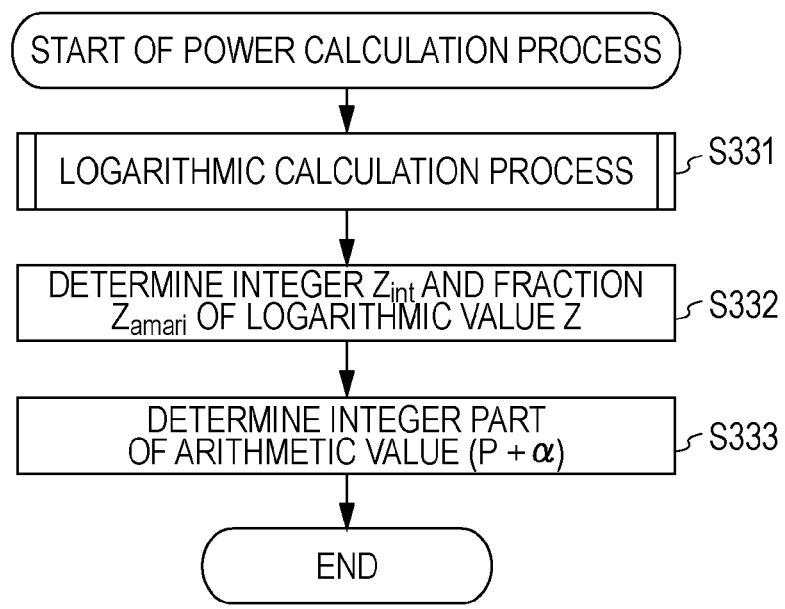
FIG. 32 is a flowchart illustrating a power calculation process of the arithmetic processing apparatus.

A power calculation process of the arithmetic processing apparatus 411 is described below with reference to a flowchart illustrated in FIG. 32. Step S331 is identical to step S71 as illustrated in FIG. 13, and the discussion thereof is omitted here.

In step S332, the integer/fraction splitter 421 determines the integer $Z_{int}$ and the fraction $Z_{amari}$ of the logarithmic value Z in accordance with equations (59) and (60) in response to the logarithmic value Z from the logarithmic calculation processor 141. Through the calculation represented by equation (60), the fraction $Z_{amari}$ becomes a fixed-point number with the decimal point placed at the 23rd bit. The integer/fraction splitter 421 then supplies the determined integer $Z_{int}$ and the fraction $Z_{amari}$ to the power integer converter 422.

In step S333, the power integer converter 422 determines the integer part of the arithmetic value (P+α) based on the integer $Z_{int}$ and the fraction $Z_{amari}$ from the integer/fraction splitter 421.

For example, an arithmetic device in the power integer converter 422 determines the power value ($2^{\wedge}Z_{amari}$) with the fraction $Z_{amari}$ as a power exponent in response to the fraction $Z_{amari}$ supplied from the integer/fraction splitter 421.

The range taken by the fraction $Z_{amari}$ is $0 \le Z_{amari} < 1.0$, and the power value has base 2. The arithmetic device performing a power calculation of base 2 at a high speed may be used to determine the power value ($2^{\wedge}Z_{amari}$). With such an arithmetic device used instead of a general-purpose arithmetic device, the power integer converter 422 may be simple-structured and miniaturized.

When the power value ($2^{\wedge}Z_{amari}$) is determined, the power integer converter 422 calculates equation (63) in response to the power value ($2^{\wedge}Z_{amari}$) and the integer $Z_{int}$ from the integer/fraction splitter 421, thereby determining the integer part of the arithmetic value (P+α).

$$(int)(P+\alpha)=(int)(2^{Z_{amari}} \times 2^{23}) >> (23-Z_{int}) \qquad (63)$$

where symbol ">>" denotes a right-shift operation. The power integer converter 422 converts the power value ($2^{\wedge}Z_{amari}$) into a fixed-point number with the decimal point at the 23rd bit by determining the integer part of a value that results from multiplying the power value ($2^{\wedge}Z_{amari}$) by $2^{23}$. The power integer converter 422 right-shifts a fixed-point number (int) $((2^{\wedge}Z_{amari}) \times 2^{23})$ by $(23-Z_{int})$ bits, thereby determining the value (int)(P+α) of the integer part of the arithmetic value (P+α).

As in equation (61), the right-shift operation by $(23-Z_{int})$ bits is performed because of the following reasons. The power value (int) $((2^{\wedge}Z_{amari}) \times 2^{23})$ is fixed-point type data with the decimal point at the 23rd bit. If the decimal point of the power value (int) $((2^{\wedge}Z_{amari}) \times 2^{23})$ is shifted to the lower bit side by $(23-Z_{int})$ bits, the integer part of the arithmetic value (P+α) is extracted.

The power integer converter 422 determines and outputs the integer part of the arithmetic value (P+α). The power calculation process is thus completed.

Since the number to be processed is binary, the arithmetic processing apparatus 411 determines the integer part of the arithmetic value (P+α) by determining the logarithmic value having base 2, and the power value having base 2. If the input value X is represented by a base-M number, the integer part of the arithmetic value (P+α) is determined with a pair of a logarithm with M as a base (the logarithmic value Z), and a power of M.

The arithmetic device of the power integer converter 422 in the arithmetic processing apparatus 411 performs the power calculation of a power of 2. The power value may be determined using the power of fraction table.

Figure 33:
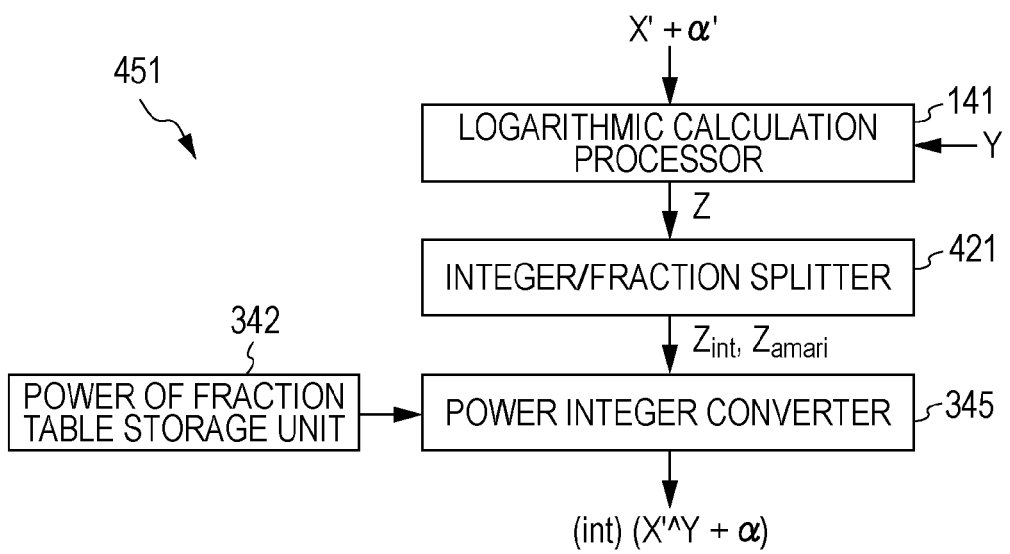
FIG. 33 illustrates an arithmetic processing apparatus.

An arithmetic processing apparatus 451 having such a structure is illustrated in FIG. 33. As illustrated in FIG. 33, elements identical to those in FIGS. 26 and 31 are designated with the same reference numerals, and the discussion thereof is omitted as appropriate.

The arithmetic processing apparatus 451 includes power of fraction table storage unit 342, logarithmic calculation processor 141, integer/fraction splitter 421, and power integer converter 345. In the arithmetic processing apparatus 451, the logarithmic calculation processor 141 receives the input value $X=X'+\alpha^{1/Y}$ and the power exponent Y.

The power integer converter 345 determines the integer part of the arithmetic value (P+α) through a shift operation using the integer $Z_{int}$ and the fraction $Z_{amari}$ from the integer/fraction splitter 421 while referencing the power of fraction table of the power of fraction table storage unit 342. The power integer converter 345 then outputs the integer part of the arithmetic value (P+α). The integer part of the arithmetic value (P+α) here is the sum of the arithmetic value P=X'$^Y$ and the constant α, namely, the arithmetic value (P+α)=X$^Y$.

Figure 34:
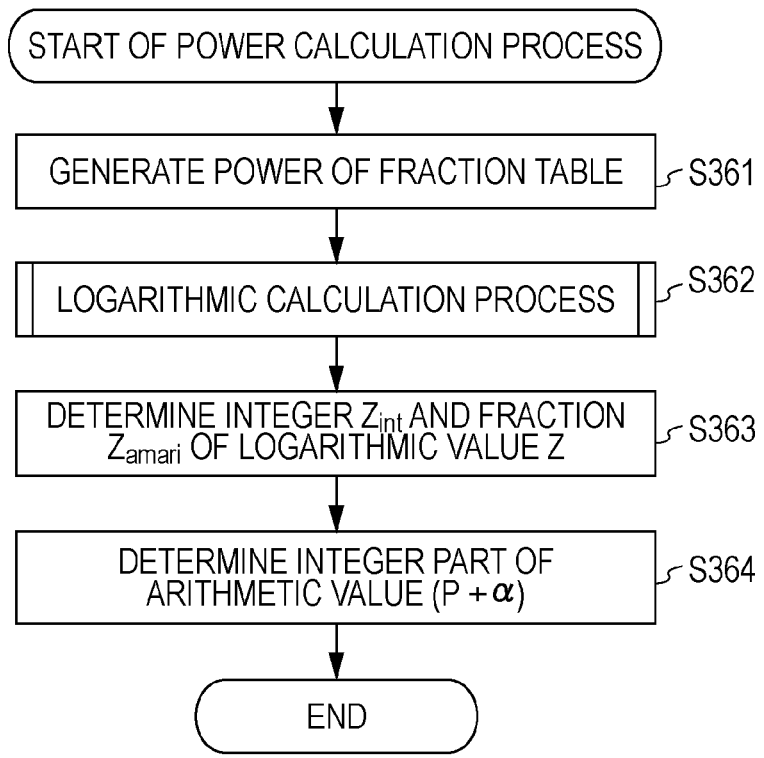
FIG. 34 is a flowchart illustrating a power calculation process of the arithmetic processing apparatus.

A power calculation process of the arithmetic processing apparatus 451 is described below with reference to a flowchart of FIG. 34.

In step S361, the power of fraction table storage unit 342 generates the power of fraction table. With the table size of the power of fraction table being $2^N$=SIZE, the power of fraction table composed of the table value twotable[i] represented by equation (58) is generated.

The variable i, representing the value of the index index2 determined from the fraction $Z_{amari}$, is i=0, . . . , (SIZE−1). In equation (58), the approximate value $2^{(i/SIZE)}$ is multiplied by $2^{23}$ for integerization, and thus becomes a fixed-point value. More specifically, the table value twotable[i] is a fixed-point number with the decimal point at the 23rd bit.

Subsequent to the generation of the power of fraction table, steps S362 and S363 are executed. Steps S362 and S363 are respectively identical to steps S331 and S332 illustrated in FIG. 32, and the discussion thereof is omitted here.

The logarithmic calculation processor 141 determines the logarithmic value Z from the input value X=X'+α$^{1/Y}$ and the power exponent Y and supplies the logarithmic value Z to the integer/fraction splitter 421. The integer/fraction splitter 421 determines the integer $Z_{int}$ and the fraction $Z_{amari}$ of the logarithmic value Z in accordance with equations (59) and (60), and then supplies the integer $Z_{int}$ and the fraction $Z_{amari}$ to the power integer converter 345.

In step S364, the power integer converter 345 determines the integer part of the arithmetic value (P+α) using the integer $Z_{int}$ and the fraction $Z_{amari}$ from the integer/fraction splitter 421 and then outputs the integer part of the arithmetic value (P+α). The power calculation process thus ends. The arithmetic value (P+α) here is the sum of the arithmetic value P=X'Y and the constant α, namely, the arithmetic value (P+α)=X$^Y$.

The power integer converter 345 calculates equations (37) and (38) in response to the fraction $Z_{amari}$, thereby determining as the index index2 the value of upper N bits of the fraction $Z_{amari}$ from the 22nd bit. The power integer converter 345 calculates equation (56) using the index index2, thereby determining the power value ($2^{\hat{}}Z_{amari}$).

More specifically, the power integer converter 345 retrieves as the power value ($2^{\hat{}}Z_{amari}$) the table value twotable[index2] with the variable i being the index index2 from the power of fraction table of the power of fraction table storage unit 342.

Furthermore, the power integer converter 345 calculates equation (61) based on the determined power value ($2^{\hat{}}Z_{amari}$), and the integer $Z_{int}$ from the integer/fraction splitter 421, thereby determining the integer part of the arithmetic value (P+α).

The arithmetic processing apparatus 451 determines the power value ($2^{\hat{}}Z_{amari}$) using the power of fraction table. The arithmetic processing apparatus 451 thus determines the power value ($2^{\hat{}}Z_{amari}$) without using the arithmetic device unlike the power integer converter 422 illustrated in FIG. 31.

The arithmetic processing apparatus 451 may determine the integer part of the arithmetic value (P+α) based on the logarithmic value having base M and a power of M in response to an M-based input value X.

In the above discussion, the arithmetic processing apparatus 451 performs the power calculation process of the power of 2 using the power of fraction table. The power value may be determined using the interpolation process in addition to the table value of the power of fraction table.

Figure 35:
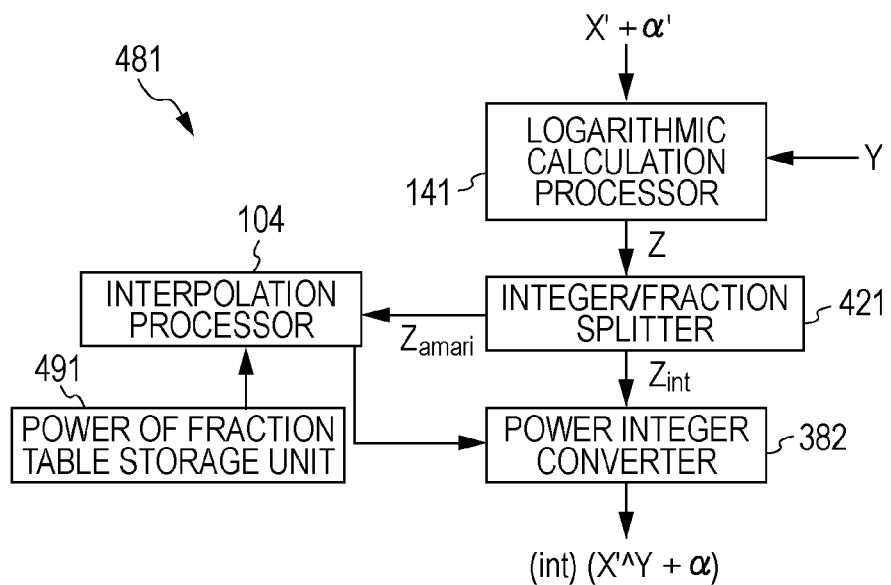
FIG. 35 illustrates an arithmetic processing apparatus.

An arithmetic processing apparatus 481 having such a structure is illustrated in FIG. 35. In FIG. 35, elements identical to those illustrated in FIGS. 31 and 28 are designated with the same reference numerals and the discussion thereof is omitted as appropriate.

The arithmetic processing apparatus 481 includes power of fraction table storage unit 491, logarithmic calculation processor 141, integer/fraction splitter 421, interpolation processor 104, and power integer converter 382. In the arithmetic processing apparatus 481, the logarithmic calculation processor 141 receives the input value X=X'+α$^{1/Y}$ and the power exponent Y.

The power of fraction table storage unit 491, storing a power of fraction table, supplies to the interpolation processor 104 a table value identified by the index index2 determined from the fraction $Z_{amari}$ of the logarithmic value Z. The table value is fixed-point type in the power of fraction table stored on the power of fraction table storage unit 491.

Using the index index2 determined from the fraction $Z_{amari}$ supplied from the integer/fraction splitter 421, the interpolation processor 104 retrieves a table value close to the index index2 from the power of fraction table storage unit 491. The interpolation processor 104 also performs the interpolation process on the acquired table value, thereby determining a power value of 2 to the power of the fraction $Z_{amari}$ as a power exponent.

The power integer converter 382 determines the integer part of the arithmetic value (P+α) based on the power value from the interpolation processor 104 and the integer $Z_{int}$ from the integer/fraction splitter 421 and then outputs the integer part of the arithmetic value (P+α).

Figure 36:
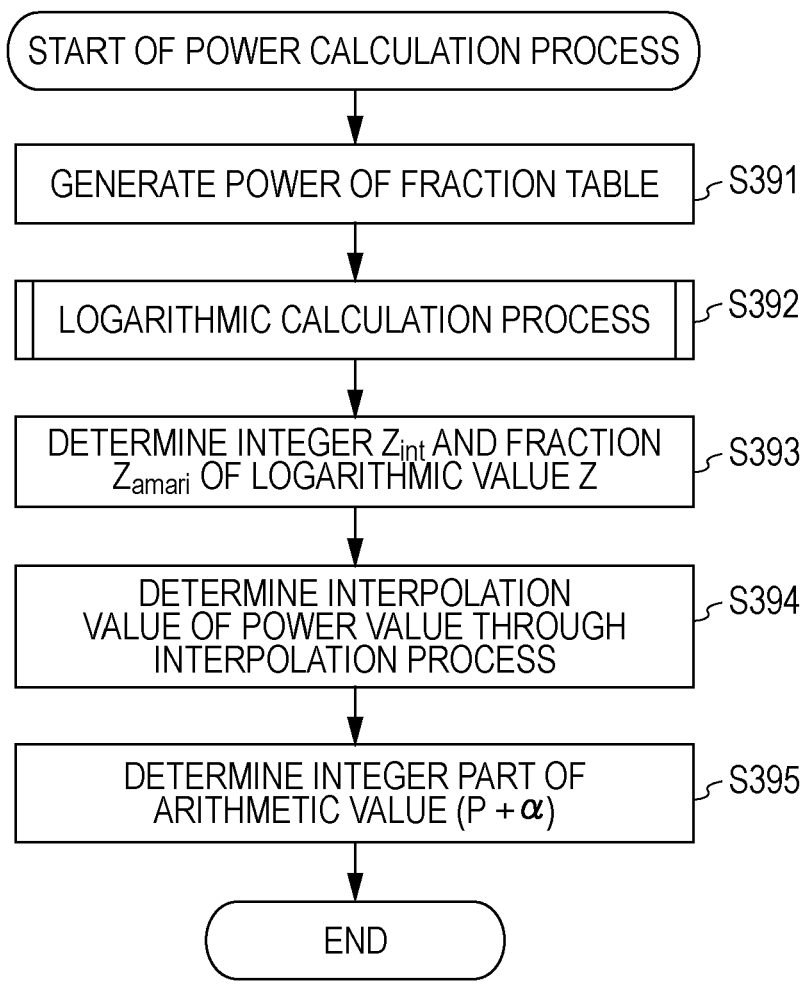
FIG. 36 is a flowchart illustrating a power calculation process of the arithmetic processing apparatus.

A power calculation process of the arithmetic processing apparatus 481 is described below with reference to a flowchart illustrated in FIG. 36.

In step S391, the power of fraction table storage unit 491 generates the power of fraction table. If the interpolation processor 104 performs a quadratic interpolation as the interpolation process, the power of fraction table storage unit 491 sets the table size of the power of fraction table to be $2^N$+2=SIZE+2. The power of fraction table storage unit 491 generates the power of fraction table composed of the table value twotable[i] represented by the following equation (64):

$$\text{twotable}[i]=(\text{int})(2^{(i/SIZE)} \times 2^{23}), i=0, \ldots, \text{SIZE}+1 \qquad (64)$$

The variable i of the table value twotable[i] indicates the value of the index index2 used to identify the table value twotable[i] determined from the fraction $Z_{amari}$ wherein the variable i is i=0, . . . , (SIZE+1). The table values twotable[i] of the number equal to the number of table sizes (SIZE+2) are prepared.

If the index index2 is the value of several upper bits of the fraction $Z_{amari}$, $2^{(i/SIZE)}$ in equation (64) is an approximate value of the power value $2^{\hat{}}Z_{amari}$ having 2 as a base and the fraction $Z_{amari}$ as a power exponent. In equation (64), the approximate value $2^{(i/SIZE)}$ is multiplied by $2^{23}$ for integerization. The approximate value $2^{(i/SIZE)}$ is thus the fixed-point number with the decimal point at the 23rd bit (fixed-point type binary data).

The power of fraction table storage unit 491 determines the table value twotable[i] responsive to each of the variables i of SIZE units, and generates and stores the power of fraction table that maps each variable i to the respective table value twotable[i].

If the interpolation processor 104 performs a linear interpolation as the interpolation process, the table size of the power of fraction table is $2^N$+1=SIZE+1. The power of fraction table composed of the table value twotable[i] represented by equation (64) is thus generated.

It is sufficient if the process of generating the power of fraction table is performed once prior to the calculation of the integer part of the arithmetic value (P+α). Once the power of fraction table is generated, the generated power of fraction table may be used when the integer part is calculated.

Subsequent to the generation of the power of fraction table, steps S392 and S393 are executed. Steps S392 and S393 are respectively identical to steps S331 and S332 illustrated in FIG. 32, and the discussion thereof is omitted here.

The logarithmic calculation processor 141 determines the logarithmic value Z from the input value $X=X'+\alpha^{1/Y}$ and the constant α. The logarithmic value Z is then supplied to the integer/fraction splitter 421. The integer/fraction splitter 421 determines the integer $Z_{int}$ and the fraction $Z_{amari}$ of the logarithmic value Z in accordance with equations (59) and (60). The integer $Z_{int}$ is supplied from the integer/fraction splitter 421 to the power integer converter 382. The fraction $Z_{amari}$ is supplied from the integer/fraction splitter 421 to the interpolation processor 104.

In step S394, the interpolation processor 104 performs the interpolation process on the fraction $Z_{amari}$ from the integer/fraction splitter 421, thereby determining an interpolation value of a power value of 2 to the power of the fraction $Z_{amari}$ as a power exponent.

More specifically, the interpolation processor 104 calculates equations (37) and (38), thereby determining the index index2. Moreover, the interpolation processor 104 calculates equation (39), thereby determining the lower value $X_{h2}$ as the value of a portion of the fraction $Z_{amari}$ from the (22−N)-th bit to the zero-th bit.

When the index index2 and the lower value $X_{h2}$ are determined in this way, the interpolation processor 104 further performs the interpolation process on the table value in the power of fraction table of the power of fraction table storage unit 491 identified by the index index2, and the lower value $X_{h2}$.

If a linear interpolation is performed as the interpolation process, the interpolation processor 104 determines the table value $V_{20}$ and the table value $V_{21}$ by calculating equations (40) and (41). More specifically, the interpolation processor 104 retrieves the table value $V_{20}$ and the table value $V_{21}$ from the power of fraction table storage unit 491. The interpolation processor 104 performs the interpolation process by calculating equations (42) through (44) in response to the retrieved table values and the lower value $X_{h2}$, thereby determining the interpolation value $(2^{Z_{amari}})$ of the power value.

If a quadratic interpolation is performed as the interpolation process, the interpolation processor 104 calculates equations (40), (41), and (45), thereby determining the table value $V_{20}$ through the table value $V_{22}$. The interpolation processor 104 thus performs the quadratic interpolation by calculating equations (46) through (49) in response to the determined table values and the lower value $X_{h2}$. The interpolation value $(2^{Z_{amari}})$ of the power value thus results.

If no interpolation is performed, the interpolation processor 104 sets the table value $V_{20}$ obtained through equation (40) to be the interpolation value $(2^{Z_{amari}})$ of the power value.

The interpolation value $(2^{Z_{amari}})$ of the power value serves the final power value $(2^{Z_{amari}})$ and is supplied from the interpolation processor 104 to the power integer converter 382.

In step S395, the power integer converter 382 determines the integer part of the arithmetic value (P+α) in response to the power value from the interpolation processor 104 and the integer $Z_{int}$ from the integer/fraction splitter 421. The power integer converter 382 thus outputs the integer part of the arithmetic value (P+α). The power calculation process thus ends.

The power integer converter 382 calculates equation (61) in response to the power value $(2^{Z_{amari}})$ from the interpolation processor 104 and the integer $Z_{int}$ from the integer/fraction splitter 421, thereby determining the integer part of the arithmetic value (P+α).

The arithmetic processing apparatus 481 may determine the integer part of the arithmetic value (P+α) based on the logarithmic value having base M and a power of M in response to an M-based input value X. The interpolation process of the interpolation processor 104 is not limited to the linear interpolation and the quadratic interpolation. A cubic or higher polynomial interpolation, or a spline interpolation may be performed.

Each of the arithmetic processing apparatus 411 illustrated in FIG. 31, the arithmetic processing apparatus 451 illustrated in FIG. 33, and the arithmetic processing apparatus 481 illustrated in FIG. 35 determines the integer part of the arithmetic value (P+α) as the input value $X=X'+\alpha^{1/Y}$. The integer part of the arithmetic value (P+α) is determined easily at a high speed.

More specifically, instead of determining the integer part of the arithmetic value (P+α) subsequent to the determination of the arithmetic value P, the integer part of the arithmetic value (P+α) is directly determined from the power value $(2^{Z_{amari}})$ and the integer $Z_{int}$. A process block corresponding to the integer converter 108 illustrated in FIG. 5 becomes unnecessary, and the arithmetic processing apparatus is miniaturized.

The logarithmic calculation processor 141 in each of the arithmetic processing apparatus 411, the arithmetic processing apparatus 451, and the arithmetic processing apparatus 481 may have any of the structures illustrated in FIGS. 14, 16, and 18, taking into consideration the calculation accuracy and the process amount. Each arithmetic processing apparatus may have a minimum number of structural elements satisfying intended calculation accuracy.

The absolute error mean values U are listed as illustrated in FIG. 30 as to whether the table values in each of the logarithmic mantissa table storage unit 102 in FIG. 5, the power of fraction table storage unit 342 in FIG. 33, and the power of fraction table storage unit 491 in FIG. 35 are interpolated or non-interpolated. The interpolation process increases the calculation accuracy of the integer part of the arithmetic value (P+α).

The above series of process steps may be executed using hardware or software. If the series of process steps are executed using software, a program forming the software may be installed from a program storage medium to a computer contained in particular hardware, or a general-purpose personal computer that executes a variety of functions with a variety of programs installed thereon.

Figure 37:
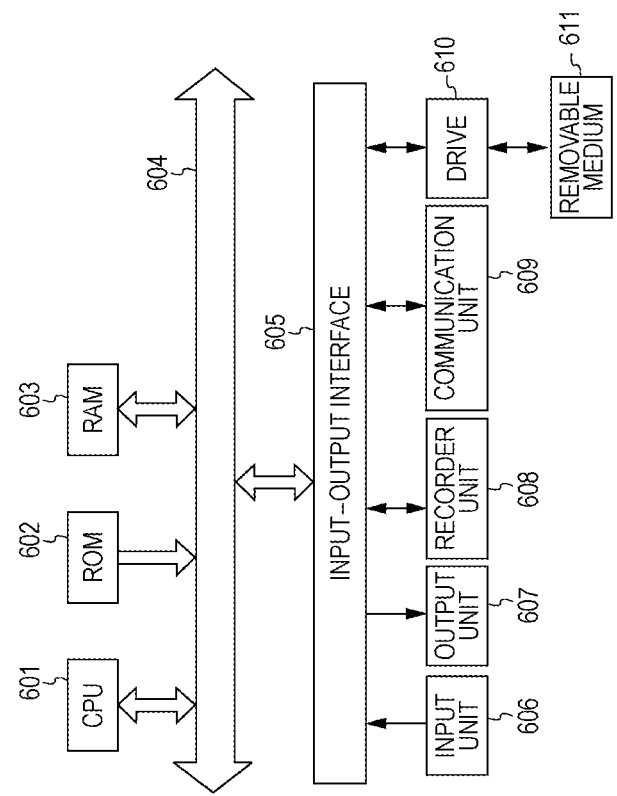
FIG. 37 illustrates a structure of a computer.

FIG. 37 is a block diagram illustrating a hardware structure of the computer that executes the above-described variety of process steps in accordance with the program.

In the computer, a central processing unit (CPU) 601, a read-only memory (ROM) 602, and a random-access memory (RAM) 603 are interconnected via a bus 604.

An input-output interface 605 connects to the bus 604. The input-output interface 605 also connects to an input unit 606 including a keyboard, a mouse, a microphone, etc., an output unit 607 including a display, a loudspeaker, etc., a recorder unit 608 including a hard disk, a non-volatile memory, etc., a communication unit 609 including a network interface, etc., and a drive 610 driving a removable medium 611 including a magnetic disk, an optical disk, a magneto-optical disk, a semiconductor memory, etc.

The CPU 601 in the computer loads the program recorded on the recorder unit 608 onto the RAM 603 via the input-output interface 605 and the bus 604, and executes the program. The above-described series of process steps are thus executed.

The program executed by the computer (CPU 601) is recorded on the removable media 611 as package media including a magnetic disc (flexible disc), optical discs (including a compact disc read only memory (CD-ROM), a digital versatile disc (DVD), etc.), a magneto-optical (MO) disc, and a semiconductor memory. The program may be supplied via a wireless or wired transmission medium such as a local area network (LAN), the Internet, or digital satellite broadcasting.

The program may be installed onto the recorder unit 608 via the input-output interface 605 by loading the removable medium 611 onto the drive 610. The program may be received by the communication unit 609 through a wireless or wired transmission medium, and then installed onto the recorder unit 608. The program may be pre-installed onto one of the ROM 602 and the recorder unit 608.

The program of the computer may be executed in the order of the process steps described in this specification, or may be executed in parallel or may be executed at any timing at which a call is made.

The present application contains subject matter related to that disclosed in Japanese Priority Patent Application JP 2008-194690 filed in the Japan Patent Office on Jul. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An arithmetic processing apparatus for determining an arithmetic value P, the arithmetic value P being an input value X raised to a power of a variable Y as an exponent, and the input value X represented by a base-M system with M being a predetermined constant number, the arithmetic processing apparatus comprising:
at least one processor; and
at least one storage medium having encoded thereon computer-executable instructions that, when executed by the at least one processor, cause the at least one processor to:
split the input value X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number;
record, in a first storage a logarithmic value of the mantissa of the input value X having the constant number M as a base thereof, determined with respect to the mantissa $X_1$;
perform an interpolation process on a plurality of logarithmic values retrieved from the first storage in response to the mantissa $X_1$ in order to determine the logarithmic value of the mantissa;
calculate a logarithmic value Z of the arithmetic value P having the constant number M as the base thereof, based on the variable Y, the exponent $X_2$, and the logarithmic value of the mantissa determined by the interpolation process; and
calculate the arithmetic value P by raising the constant value M to the power of the logarithmic value Z of the arithmetic value P as an exponent.

2. The arithmetic processing apparatus according to claim 1, wherein the computer-executable instructions, when executed by the at least one processor, further cause the at least one processor to:
split the logarithmic value Z of the arithmetic value P into an integer $Z_{int}$ as an integer part of the logarithmic value Z and a fraction $Z_{amari}$ as a fraction part of the logarithmic value Z; and
record, in a second storage, a power value of the constant number M determined by raising the constant value M to the power of the fraction part $Z_{amari}$ as an exponent,
wherein the arithmetic value P is calculated based on the power value of the constant number M retrieved from the second storage in response to the fraction $Z_{amari}$, and the integer $Z_{int}$.

3. The arithmetic processing apparatus according to claim 2, wherein the interpolation process to determine the power value of the constant number M comprises performing the interpolation process on a plurality of power values retrieved from the second storage in response to the fraction $Z_{amari}$, and
wherein the arithmetic value P is calculated based on the power value of the constant number M, and the integer $Z_{int}$.

4. An arithmetic processing method of an arithmetic processing apparatus for determining an arithmetic value P, the arithmetic value P being an input value X raised to a power of a variable Y as an exponent, and the input value X represented by a base-M system with M being a predetermined constant number, the processing apparatus including:
at least one processor; and
at least one storage medium having encoded thereon computer-executable instructions;
mantissa/exponent splitting means for splitting the input value X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number;
recording means for recording a logarithmic value of the mantissa of the input value X having the constant number M as a base thereof, determined with respect to the mantissa $X_1$;
interpolating means for performing an interpolation process on a plurality of logarithmic values retrieved from the recording means in response to the mantissa $X_1$ in order to determine the logarithmic value of the mantissa;
logarithmic calculation means for calculating a logarithmic value Z of the arithmetic value P having the constant number M as the base thereof, based on the variable Y, the exponent $X_2$, and the logarithmic value of the mantissa determined by the interpolating means; and
power calculation means for calculating the arithmetic value P by raising the constant value M to the power of the logarithmic value Z of the arithmetic value P as an exponent,
the arithmetic processing method comprising:
executing the computer-executable instructions by the at least one processor to cause the arithmetic processing apparatus to:

split the input value X into the mantissa $X_1$ and the exponent $X_2$;

perform the interpolation process on the plurality of logarithmic values in order to determine the logarithmic value of the mantissa;

calculate the logarithmic value Z; and calculate the arithmetic value P by raising the constant value M to the power of the logarithmic value Z as an exponent.

5. A non-transitory computer-readable storage medium comprising computer-executable instructions that, when executed by a computer, cause an arithmetic processing apparatus to perform a method of determining an arithmetic value P, the arithmetic value P being an input value X raised to the power of a variable Y as an exponent, and the input value X represented by a base-M system with M being a predetermined constant number, the method comprising:

splitting the input value X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number;

performing an interpolation process on a plurality of logarithmic values of the mantissa of the input value X having the constant number M as a base determined with respect to the mantissa $X_1$ in order to determine a final logarithmic value of the mantissa;

calculating a logarithmic value Z of the arithmetic value P having the constant number M as the base thereof, based on the variable Y, the exponent $X_2$, and the final logarithmic value of the mantissa determined in the interpolation process; and calculating the arithmetic value P by raising the constant value M to a power of the logarithmic value Z of the arithmetic value P as an exponent.

6. An arithmetic processing apparatus for determining an arithmetic value P, the arithmetic value P being an input value X raised to a power of a variable Y as an exponent, and the input value X represented by a base-M system with M being a predetermined constant number, the arithmetic processing apparatus comprising:

at least one processor; and at least one storage medium having encoded thereon computer-executable instructions that, when executed by the at least one processor, cause the at least one processor to:

split the input value X in floating-point type data into a mantissa $X_1$ and an exponent $X_2$, the mantissa $X_1$ being a mantissa part representing a mantissa of the input value X of a floating-point number, and the exponent $X_2$ being an exponent part representing an exponent of the input value X of the floating-point number;

record, in a first recording unit, a logarithmic value of the mantissa of the input value X having the constant number M as a base thereof, determined with respect to the mantissa $X_1$;

perform an interpolation process on a plurality of logarithmic values retrieved from the first recording unit in response to the mantissa $X_1$ in order to determine the logarithmic value of the mantissa;

calculate a logarithmic value Z of the arithmetic value P having the constant number M as the base thereof, based on the variable Y, the exponent $X_2$, and the logarithmic value of the mantissa determined by the interpolation process; and calculate the arithmetic value P by raising the constant value M to the power of the logarithmic value Z of the arithmetic value P as an exponent.

* * * * *